(12) United States Patent
Iizuka

(10) Patent No.: US 7,478,282 B2
(45) Date of Patent: Jan. 13, 2009

(54) LOG ACQUISITION METHOD AND ITS CONTROL PROGRAM AND STORAGE MEDIUM

(75) Inventor: Toshiaki Iizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1045 days.

(21) Appl. No.: 10/815,506

(22) Filed: Mar. 31, 2004

(65) Prior Publication Data

US 2004/0199903 A1 Oct. 7, 2004

(30) Foreign Application Priority Data

Apr. 2, 2003 (JP) .............................. 2003-099465

(51) Int. Cl.
*G06F 11/00* (2006.01)
(52) U.S. Cl. .............................. 714/38; 714/20; 714/45; 717/124; 717/128
(58) Field of Classification Search .................. 714/20, 714/38, 45
See application file for complete search history.

(56) References Cited

U.S. PATENT DOCUMENTS

| | | | | |
|---|---|---|---|---|
| 5,812,828 | A * | 9/1998 | Kaufer et al. .................. | 703/22 |
| 5,970,245 | A * | 10/1999 | Poteat et al. ................. | 717/128 |
| 6,161,216 | A * | 12/2000 | Shagam ....................... | 717/128 |
| 6,996,808 | B1 * | 2/2006 | Niewiadomski et al. .... | 717/130 |
| 7,086,034 | B2 * | 8/2006 | Mihara ........................ | 717/124 |
| 7,188,279 | B2 * | 3/2007 | Iizuka ......................... | 714/38 |
| 2004/0199903 | A1 * | 10/2004 | Iizuka ......................... | 717/128 |
| 2005/0171731 | A1 * | 8/2005 | Chen et al. ................... | 702/176 |

FOREIGN PATENT DOCUMENTS

| | | |
|---|---|---|
| JP | 06-314221 | 11/1994 |
| JP | 08-179964 | 7/1996 |
| JP | 08-314752 | 11/1996 |
| JP | 11-296415 A | 10/1999 |

OTHER PUBLICATIONS

Office Action dated Oct. 1, 2007 concerning the basic Japanese Patent Application No. 2003-099465.

* cited by examiner

*Primary Examiner*—Emerson C Puente
(74) *Attorney, Agent, or Firm*—Morgan & Finnegan, LLP

(57) ABSTRACT

A log acquisition method which can easily acquire processing logs of software, and can reduce the number of processes required to analyze bugs is provided. More specifically, a log acquisition method for a program having functions, includes a step of identifying a designated one of functions in an OS which are called upon execution of the program, and a step of rewriting the address of the loaded functions that execute predetermined processes and the address of the designated function in the OS to that of a function for log acquisition. The function for log acquisition includes a step of calling the functions that execute predetermined processes and the designated function in the OS and passing the execution result of the called functions to the program, and a step of recording predetermined information upon calling the functions that execute predetermined processes and the designated function in the OS, and predetermined information upon receiving the result.

11 Claims, 40 Drawing Sheets

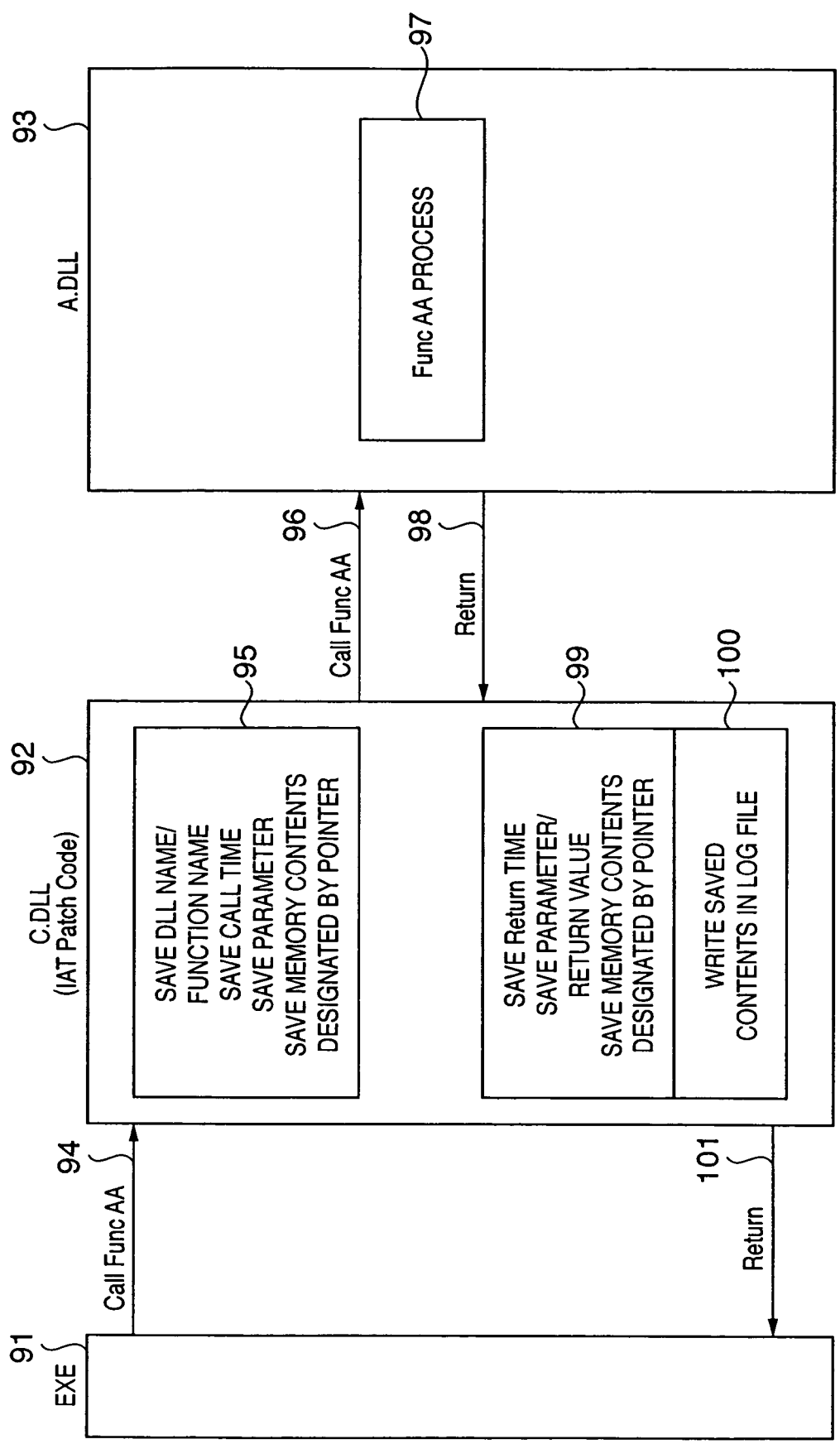

FIG. 10

Interface NAME :       Interface A
Method NAME : Method AA
ARGUMENT :             DWORD dwID
RETURN VALUE :         DWORD dwRet Interface NAME :       Interface A
Method NAME : Method AB
ARGUMENT :             DWORD dwSize
RETURN VALUE :         int  nRet Interface NAME :       Interface A
Method NAME : Method AC
ARGUMENT :             DWORD dwSize
RETURN VALUE :         DWORD dwRet Interface NAME :       Interface B
Method NAME : Method BA
ARGUMENT :             DWORD dwSize
RETURN VALUE :         int  nRet Interface NAME :       Interface B
Method NAME : Method BC
ARGUMENT :             DWORD dwID
RETURN VALUE :         DWORD dwRet

FIG. 11

Interface NAME :        Interface A
Method NAME : Method AA
ARGUMENT :              DWORD dwID : 256
RETURN VALUE :          DWORD dwRet : 0
In TIME :               2002/03/25 22 : 24 : 12. 025
Out TIME :              2002/03/25 22 : 24 : 12. 035

Interface NAME :        Interface B
Method NAME : Method BA
ARGUMENT :              DWORD dwSize : 512
RETURN VALUE :          int nRet : -1
In TIME :               2002/03/25 22 : 24 : 12. 046
Out TIME :              2002/03/25 22 : 24 : 12. 057

Interface NAME :        Interface B
Method NAME : Method BC
ARGUMENT :              DWORD dwID : 12
RETURN VALUE :          DWORD dwRet : 2
In TIME :               2002/03/25 22 : 24 : 12. 068
Out TIME :              2002/03/25 22 : 24 : 12. 079

| | |
|---|---|
| MODULE NAME | ModuleA. dll |
| FUNCTION NAME : | FuncA |
| In ARGUMENT : | int nIndex :     3 |
| Out ARGUMENT : | DWORD * nRet : 0x007a61c0/0x0000000a(10) |
| RETURN VALUE : | int :     0 |
| In TIME : | 2002/03/25  22 : 24 : 12. 025 |
| Out TIME : | 2002/03/25  22 : 24 : 12. 035 |
| | |
| MODULE NAME | Kernel32. dll |
| FUNCTION NAME : | FuncB |
| In ARGUMENT : | int nIndex :     1 |
| Out ARGUMENT : | DWORD * nRet : 0x007a625c/0x0000000b(11) |
| RETURN VALUE : | int :     0 |
| In TIME : | 2002/03/25  22 : 24 : 12. 046 |
| Out TIME : | 2002/03/25  22 : 24 : 12. 057 |
| | |
| MODULE NAME | ModuleB. dll |
| FUNCTION NAME : | FuncD |
| In ARGUMENT : | int nIndex :     4 |
| Out ARGUMENT : | DWORD * nRet : 0x007b61c0/0x0000000d(13) |
| RETURN VALUE : | int :     0 |
| In TIME : | 2002/03/25  22 : 24 : 12. 089 |
| Out TIME : | 2002/03/25  22 : 24 : 13. 000 |
| | |
| MODULE NAME | User32. dll |
| FUNCTION NAME : | FuncE |
| In ARGUMENT : | int nIndex :     6 |
| Out ARGUMENT : | DWORD * nRet : 0x002a61c0/0x0000000e(14) |
| RETURN VALUE : | int :     0 |
| In TIME : | 2002/03/25  22 : 24 : 13. 011 |
| Out TIME : | 2002/03/25  22 : 24 : 13. 022 |

| | |
|---|---|
| MODULE NAME | ModuleA. dll |
| FUNCTION NAME : | FuncA |
| In ARGUMENT : | int nIndex :     3 |
| Out ARGUMENT : | DWORD * nRet : 0x007a61c0/0x0000000a(10) |
| RETURN VALUE : | int :     0 |
| In TIME : | 2002/03/25  22 : 24 : 12. 025 |
| Out TIME : | 2002/03/25  22 : 24 : 12. 035 |
| | |
| MODULE NAME | Kernel32. dll |
| FUNCTION NAME : | FuncB |
| In ARGUMENT : | int nIndex :     1 |
| Out ARGUMENT : | DWORD * nRet : 0x007a625c/0x0000000b(11) |
| RETURN VALUE : | int :     0 |
| In TIME : | 2002/03/25  22 : 24 : 12. 046 |
| Out TIME : | 2002/03/25  22 : 24 : 12. 057 |
| | |
| MODULE NAME | Mtdll. dll |
| FUNCTION NAME : | FuncC |
| In ARGUMENT : | int nIndex :     2 |
| Out ARGUMENT : | DWORD * nRet : 0x007a6122/0x0000000c(12) |
| RETURN VALUE : | int :     0 |
| In TIME : | 2002/03/25  22 : 24 : 12. 068 |
| Out TIME : | 2002/03/25  22 : 24 : 12. 079 |
| | |
| MODULE NAME | ModuleB. dll |
| FUNCTION NAME : | FuncD |
| In ARGUMENT : | int nIndex :     4 |
| Out ARGUMENT : | DWORD * nRet : 0x007b61c0/0x0000000d(13) |
| RETURN VALUE : | int :     0 |
| In TIME : | 2002/03/25  22 : 24 : 12. 089 |
| Out TIME : | 2002/03/25  22 : 24 : 13. 000 |
| | |
| MODULE NAME | User32. dll |
| FUNCTION NAME : | FuncE |
| In ARGUMENT : | int nIndex :     6 |
| Out ARGUMENT : | DWORD * nRet : 0x002a61c0/0x0000000e(14) |
| RETURN VALUE : | int :     0 |
| In TIME : | 2002/03/25  22 : 24 : 13. 011 |
| Out TIME : | 2002/03/25  22 : 24 : 13. 022 |
| | |
| MODULE NAME | Ws2_32. dll |
| FUNCTION NAME : | FuncF |
| In ARGUMENT : | int nIndex :     5 |
| Out ARGUMENT : | DWORD * nRet : 0x002a6dc0/0x0000000f(15) |
| RETURN VALUE : | int :     0 |
| In TIME : | 2002/03/25  22 : 24 : 13. 034 |
| Out TIME : | 2002/03/25  22 : 24 : 13. 055 |

```
[
    uuid(58DB5633-0694-4340-97CE-4E1AC6BFFBA7),        //TestDllStd.
    helpstring("TestDllStd Type Library For PAT"),
    version(1.0)
]

library TestDllStd
{
        typedef [public] struct
        {
                char chParam;
                unsigned char uchParam;
                short sParam;
                unsigned short usParam;
                int nParam;
                unsigned int unParam;
                long lParam;
                unsigned long ulParam;
                double dbParam;
                float fParam;
        } TESTSTRUCT;
        typedef [public] TESTSTRUCT *LPTESTSTRUCT;

//DEFINE_GUID(GUID_PROGID, 0x8e037d65, 0xefa0, 0x40e7, 0x91, 0x43, 0xef,0x70, 0x56, 0x94, 0x5b, 0x79);
  [
    uuid(8E037D65-EFA0-40e7-9143-EF7056945B79),
    helpstring("TestDllStd.dll for PAT object."),
  ]
        interface
        test
        {
                char _stdcall FuncCharStd([in] char chParam);
                char* _stdcall FuncPCharStd([in, out] char* lpchParam);

TESTSTRUCT _stdcall FuncStructStd([in]TESTSTRUCT TestStruct);
                LPTESTSTRUCT _stdcall FuncPStructStd([in, out]LPTESTSTRUCT lpTestStruct);
        };
}
```

FIG. 19

```
                                                          /1900
define PAT_PARAM_ATTR_ID 00000000-0000-0000-0000-000000000000 typedef [public] struct
{
                                              /1901
        char chParam1;
        [custom(PAT_PARAM_ATTR_ID, "structsizeextra_is()")] long cExtraBinaryDataSize;
        char chParam2;
        char chParam3;
} TESTSTRUCT_WITHEXTRA;

interface
test
{
        void FuncStructsizeextraIs
        (                       /1902
                [out] TESTSTRUCT_WITHEXTRA* lpParam
        );
};
```

| | |
|---|---|
| MODULE NAME : | TestDllStd.DLL |
| FUNCTION NAME : | Func Structsizeextrals |
| ARGUMENT (in) : | |
| ARGUMENT (out) : | struct TESTSTRUCT_WITHEXTRA : |
| |     char chParam1 : "a" |
| |     long cExtraBinaryDataSize: 8 |
| |     char chParam2 : "b" |
| |     char chParam3 : "c" |
| |     ExtraBinaryData : 0x01F7B007. Data ID=0x0001 |
| RETURN VALUE : | void : |
| In TIME : | 2002/03/25 22 : 24 : 12. 025 |
| Out TIME : | 2002/03/25 22 : 24 : 12. 035 |
| MODULE NAME : | TestDllStd.DLL |
| FUNCTION NAME : | Func Structsizeextrals |
| ARGUMENT (in) : | |
| ARGUMENT (out) : | struct TESTSTRUCT_WITHEXTRA : |
| |     char chParam1 : "d" |
| |     long cExtraBinaryDataSize: 40 |
| |     char chParam2 : "e" |
| |     char chParam3 : "f" |
| |     ExtraBinaryData : 0x01F7B007. Data ID=0x0002 |
| RETURN VALUE : | void : |
| In TIME : | 2002/03/25 22 : 24 : 12. 046 |
| Out TIME : | 2002/03/25 22 : 24 : 12. 057 |
| MODULE NAME : | TestDllStd.DLL |
| FUNCTION NAME : | Func Structsizeextrals |
| ARGUMENT (in) : | |
| ARGUMENT (out) : | struct TESTSTRUCT_WITHEXTRA : |
| |     char chParam1 : "g" |
| |     long cExtraBinaryDataSize: 5 |
| |     char chParam2 : "h" |
| |     char chParam3 : "i" |
| |     ExtraBinaryData : 0x01F7B007. Data ID=0x0003 |
| RETURN VALUE : | void : |
| In TIME : | 2002/03/25 22 : 24 : 12. 068 |
| Out TIME : | 2002/03/25 22 : 24 : 12. 079 |
| MODULE NAME : | TestDllStd.DLL |
| FUNCTION NAME : | Func Structsizeextrals |
| ARGUMENT (in) : | |
| ARGUMENT (out) : | struct TESTSTRUCT_WITHEXTRA : |
| |     char chParam1 : "j" |
| |     long cExtraBinaryDataSize: 7 |
| |     char chParam2 : "k" |
| |     char chParam3 : "l" |
| |     ExtraBinaryData : 0x01F7B007. Data ID=0x0004 |
| RETURN VALUE : | void : |
| In TIME : | 2002/03/25 22 : 24 : 12. 100 |
| Out TIME : | 2002/03/25 22 : 24 : 12. 179 |
| ... | |

2201

Data ID: 0x0001
Size: 8

00000000: 10 00 00 00 4A 03 A5 20

Data ID: 0x0002
Size: 40

00000000: 05 00 00 00 4A 03 A5 20
00000008: 05 00 00 00 4B 03 A5 20
00000010: 05 00 00 00 4C 03 A5 20
00000018: 05 00 00 00 4D 03 A5 20
00000020: 05 00 00 00 4E 03 A5 20

Data ID: 0x0003
Size: 40

00000000: 66 4A 70 50 00

Data ID: 0x0004
Size: 7

```
                                                    ┌─2300
define PAT_PARAM_ATTR_ID 00000000-0000-0000-0000-000000000000 typedef [public] struct
{                                    ┌─2301
    char chParam1;
    [custom(PAT_PARAM_ATTR_ID, "ptrdiff()")] LPSTR lpszString;
    [custom(PAT_PARAM_ATTR_ID, "ptrdiff()")] long nNumber;
    char chParam2;                      ─2302
} TESTSTRUCT_WITHPTRDIFF;

interface
test
{
    void FuncPtrdiff
    (                           ┌─2303
         [in] TESTSTRUCT_WITHPTRDIFF* lpParam
    );
};
```

```
MODULE NAME :        TestDllStd.DLL
FUNCTION NAME :      FuncPtrdiff
ARGUMENT (in) :      struct TESTSTRUCT_WITHPTRDIFF :
                        char  chParam1 : "a"
                        Offset to LPSTR lpszString : 16
                        LPSTR lpszString : "Test1"
                        Offset to long nNumber : 28
                        long nNumber : 1
                        char  chParam3 : "b"

ARGUMENT (out) :
RETURN VALUE :       void :
In TIME :            2002/03/25  22 : 24 : 12. 025
Out TIME :           2002/03/25  22 : 24 : 12. 035
MODULE NAME :        TestDllStd.DLL
FUNCTION NAME :      FuncPtrdiff
ARGUMENT (in) :      struct TESTSTRUCT_WITHPTRDIFF :
                        char  chParam1 : "c"
                        Offset to LPSTR lpszString : 18
                        LPSTR lpszString : "Test2"
                        Offset to long nNumber : 30
                        long nNumber : 2
                        char  chParam3 : "d"

ARGUMENT (out) :
RETURN VALUE :       void :
In TIME :            2002/03/25  22 : 24 : 12. 046
Out TIME :           2002/03/25  22 : 24 : 12. 057
MODULE NAME :        TestDllStd.DLL
FUNCTION NAME :      FuncPtrdiff
ARGUMENT (in) :      struct TESTSTRUCT_WITHPTRDIFF :
                        char  chParam1 : "e"
                        Offset to LPSTR lpszString : 20
                        LPSTR lpszString : "Test3"
                        Offset to long nNumber : 32
                        long nNumber : 3
                        char  chParam3 : "f"

ARGUMENT (out) :
RETURN VALUE :       void :
In TIME :            2002/03/25  22 : 24 : 12..068
Out TIME :           2002/03/25  22 : 24 : 12. 079
MODULE NAME :        TestDllStd.DLL
FUNCTION NAME :      FuncPtrdiff
ARGUMENT (in) :      struct TESTSTRUCT_WITHPTRDIFF :
                        char  chParam1 : "g"
                        Offset to LPSTR lpszString : 16
                        LPSTR lpszString : "Test4"
                        Offset to long nNumber : 28
                        long nNumber : 29
                        char  chParam3 : "h"

ARGUMENT (out) :
RETURN VALUE :       void :
In TIME :            2002/03/25  22 : 24 : 12. 100
Out TIME :           2002/03/25  22 : 24 : 12. 179
...
```

FIG. 27

```
                                                            /2700
define PAT_PARAM_ATTR_ID 00000000-0000-0000-0000-000000000000 interface test ;        /2701 typedef struct tagGUID {
      unsigned long Data1 ;
      unsigned short Data2 ;
      unsigned short Data3 ;
      unsigned char Data4[ 8 ] ;
} GUID ;

interface test {
      HRESULT _stdcall DllGetClassObject (    /2702
            [ in, custom(PAT_PARAM_ATTR_ID, "clsid_( )" ) ] GUID* rctsid,
            [ in ] GUID* riid,
            [ out, custom(PAT_PARAM_ATTR_ID, "iid_is(riid)" ) ] void** ppv) ;
};
                                                       \2703
```

FIG. 28

```
                           2800
interface IGetInfo : IUnknown
{
        HRESULT GetName(
                [ in ]      DWORD       dwID,
                [out]       LPSTR       lpszName
        );
        HRESULT FreeNameBuffer (
                [ in ]      LPSTR       lpszName
        );
};
```

FIG. 30

| | | |
|---|---|---|
| MODULE NAME | GetInfo.dll | |
| FUNCTION NAME : | DllGetClassObject | 3000 |
| In ARGUMENT : | GUID* rclsid : | {abce80d7-9f46-11d1-882a-00c04fb961ec} |
| | GUID* riid : | {00000001-0000-0000-c000-000000000046} |
| Out ARGUMENT : | void** ppv : | 0x007a61c0/0x730e13e8(1930302440) |
| RETURN VALUE : | HRESULT : | 0x00000000(0) |
| In TIME : | 2002/03/25 22 : 24 : 12. 025 | 3002  3001 |
| Out TIME : | 2002/03/25 22 : 24 : 12. 035 | |
| | | |
| Interface NAME : | GetInfo | |
| Method NAME : | GetName | |
| In ARGUMENT : | DWORD dwID : 1 | |
| | LPSTR lpszName "Name-1" | |
| RETURN VALUE : | HRESULT : 0x00000000(0) | |
| In TIME : | 2002/03/25 22 : 24 : 12. 046 | |
| Out TIME : | 2002/03/25 22 : 24 : 12. 057 | |
| | | |
| Interface NAME : | GetInfo | |
| Method NAME : | FreeNameBuffer | |
| In ARGUMENT : | LPSTR lpszName "Name-1" | |
| RETURN VALUE : | HRESULT : 0x00000000(0) | |
| In TIME : | 2002/03/25 22 : 24 : 12. 068 | |
| Out TIME : | 2002/03/25 22 : 24 : 12. 079 | |
| | | |
| Interface NAME : | GetInfo | |
| Method NAME : | GetName | |
| In ARGUMENT : | DWORD dwID : 2 | |
| | LPSTR lpszName "Name-2" | |
| RETURN VALUE : | HRESULT : 0x00000000(0) | |
| In TIME : | 2002/03/25 22 : 24 : 12. 089 | |
| Out TIME : | 2002/03/25 22 : 24 : 13. 000 | |
| | | |
| Interface NAME : | GetInfo | |
| Method NAME : | FreeNameBuffer | |
| In ARGUMENT : | LPSTR lpszName "Name-2" | |
| RETURN VALUE : | HRESULT : 0x00000000(0) | |
| In TIME : | 2002/03/25 22 : 24 : 13. 011 | |
| Out TIME : | 2002/03/25 22 : 24 : 13. 022 | |

...

F I G. 32
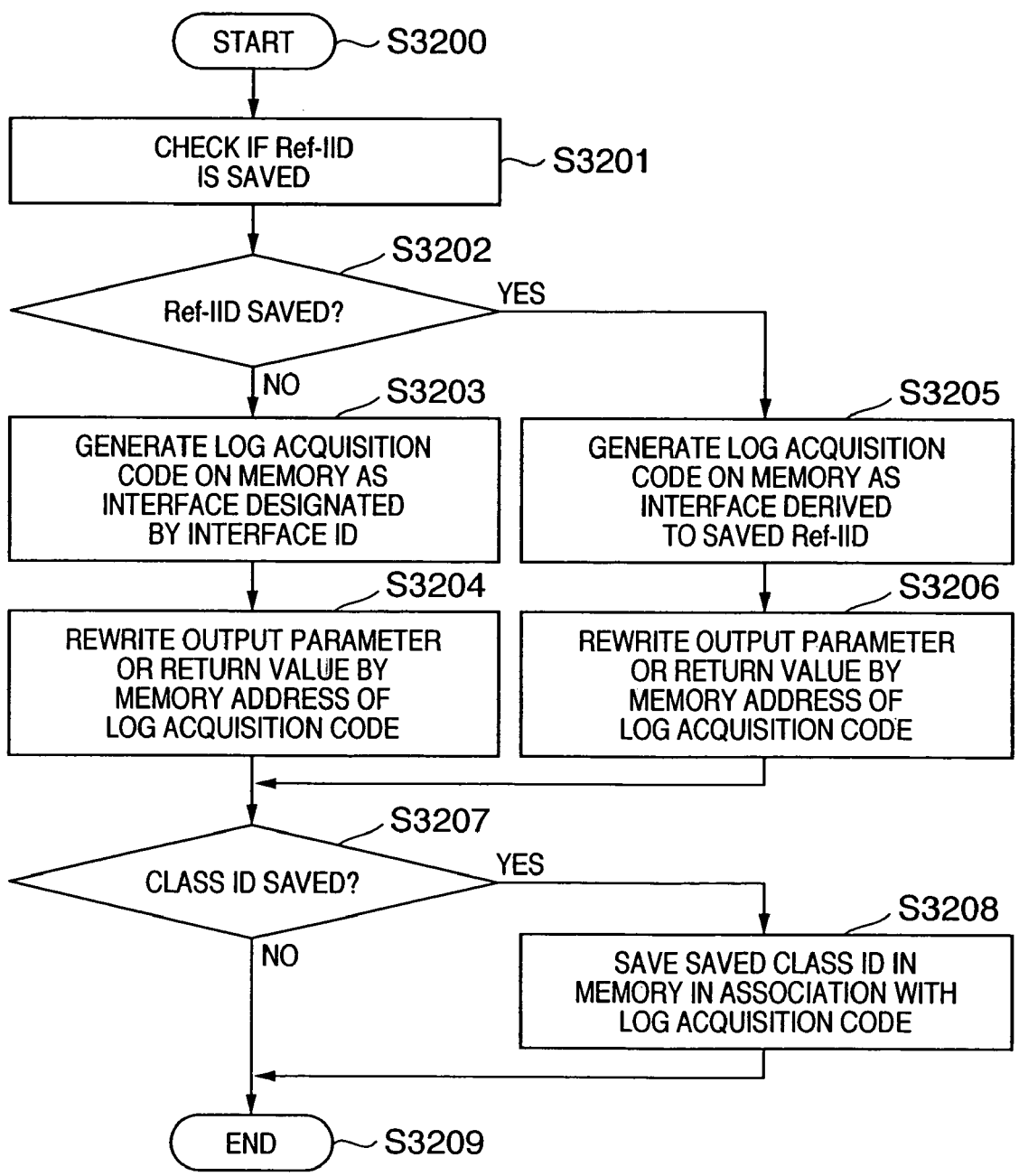

FIG. 33

| | | |
|---|---|---|
| MODULE NAME | GetInfo. dll | 3300 |
| FUNCTION NAME : | DllGetClassObject | |
| In ARGUMENT : | GUID* rclsid : {abce80d7-9f46-11d1-882a-00c04fb961ec} | |
| | GUID* riid : {00000001-0000-0000-c000-000000000046} | |
| Out ARGUMENT : | void**ppv : 0x007a61c0/0x730e13e8(1930302440) | |
| RETURN VALUE : | HRESULT : 0x00000000(0) | |
| In TIME : | 2002/03/25 22 : 24 : 12. 025 | 3302  3301 |
| Out TIME : | 2002/03/25 22 : 24 : 12. 035 | |

| | |
|---|---|
| MODULE NAME | GetInfo. dll —3303 |
| Interface NAME : | GetInfo |
| Method NAME : | GetName |
| In ARGUMENT : | DWORD dwID : 1 |
| | LPSTR lpszName "Name-1" |
| RETURN VALUE : | HRESULT : 0x00000000(0) |
| In TIME : | 2002/03/25 22 : 24 : 12. 046 |
| Out TIME : | 2002/03/25 22 : 24 : 12. 057 |

| | |
|---|---|
| MODULE NAME | GetInfo. dll —3304 |
| Interface NAME : | GetInfo |
| Method NAME : | FreeNameBuffer |
| In ARGUMENT : | LPSTR lpszName "Name-1" |
| RETURN VALUE : | HRESULT : 0x00000000(0) |
| In TIME : | 2002/03/25 22 : 24 : 12. 068 |
| Out TIME : | 2002/03/25 22 : 24 : 12. 079 |

| | |
|---|---|
| MODULE NAME | GetInfo. dll —3305 |
| Interface NAME : | GetInfo |
| Method NAME : | GetName |
| In ARGUMENT : | DWORD dwID : 2 |
| | LPSTR lpszName "Name-2" |
| RETURN VALUE : | HRESULT : 0x00000000(0) |
| In TIME : | 2002/03/25 22 : 24 : 12. 089 |
| Out TIME : | 2002/03/25 22 : 24 : 13. 000 |

| | |
|---|---|
| MODULE NAME | GetInfo. dll —3306 |
| Interface NAME : | GetInfo |
| Method NAME : | FreeNameBuffer |
| In ARGUMENT : | LPSTR lpszName "Name-2" |
| RETURN VALUE : | HRESULT : 0x00000000(0) |
| In TIME : | 2002/03/25 22 : 24 : 13. 011 |
| Out TIME : | 2002/03/25 22 : 24 : 13. 022 |

```
[
    uuid(58DB5633-0694-4340-97CE-4E1AC6BFFBA7),   //TestDllStd.
    helpstring("TestDllStd Type Library For PAT"),
    version(1.0)
]

library TestDllStd
{
        typedef [public] struct
        {
                char chParam;
                unsigned char uchParam;
                short sParam;
                unsigned short usParam;
                int nParam;
                unsigned int unParam;
                long lParam;
                unsigned long ulParam;
                double dbParam;
                float fParam;
        }TESTSTRUCT;
        typedef [public] TESTSTRUCT *LPTESTSTRUCT;

//DEFINE_GUID(GUID_PROGID, 0x8e037d65, 0xefa0, 0x40e7, 0x91, 0x43, 0xef, 0x70, 0x56, 0x94, 0
0x79);
[
    uuid(8E037D65-EFA0-40e7-9143-EF7056945B79),
    helpstring("TestDllStd.dll for PAT object."),
]
        interface
        test
        {
                char _stdcall FuncCharStd([in] char chParam);
                char* _stdcall FuncPCharStd([in, out] char* lpchParam);

TESTSTRUCT _stdcall FuncStructStd([in]TESTSTRUCT TestStruct);
                LPTESTSTRUCT _stdcall FuncPStructStd([in, out]LPTESTSTRUCT lpTestStruct);
        };
}
```

[Library] ~3500
LibraryName=TestDllStd ~3501
Patch=C:¥Windows¥System32¥spool¥drivers¥w32x86¥3
ModuleName=UnidrvUIPlugin. dll
... ~3502

FIG. 36

```
[Interface]         3600
InterfaceName=test           3601
Patch=C:¥Windows¥System32¥spool¥drivers¥w32x86¥3
ModuleName=UnidrvUIPlugin. dll
...            3602
```

F I G. 37
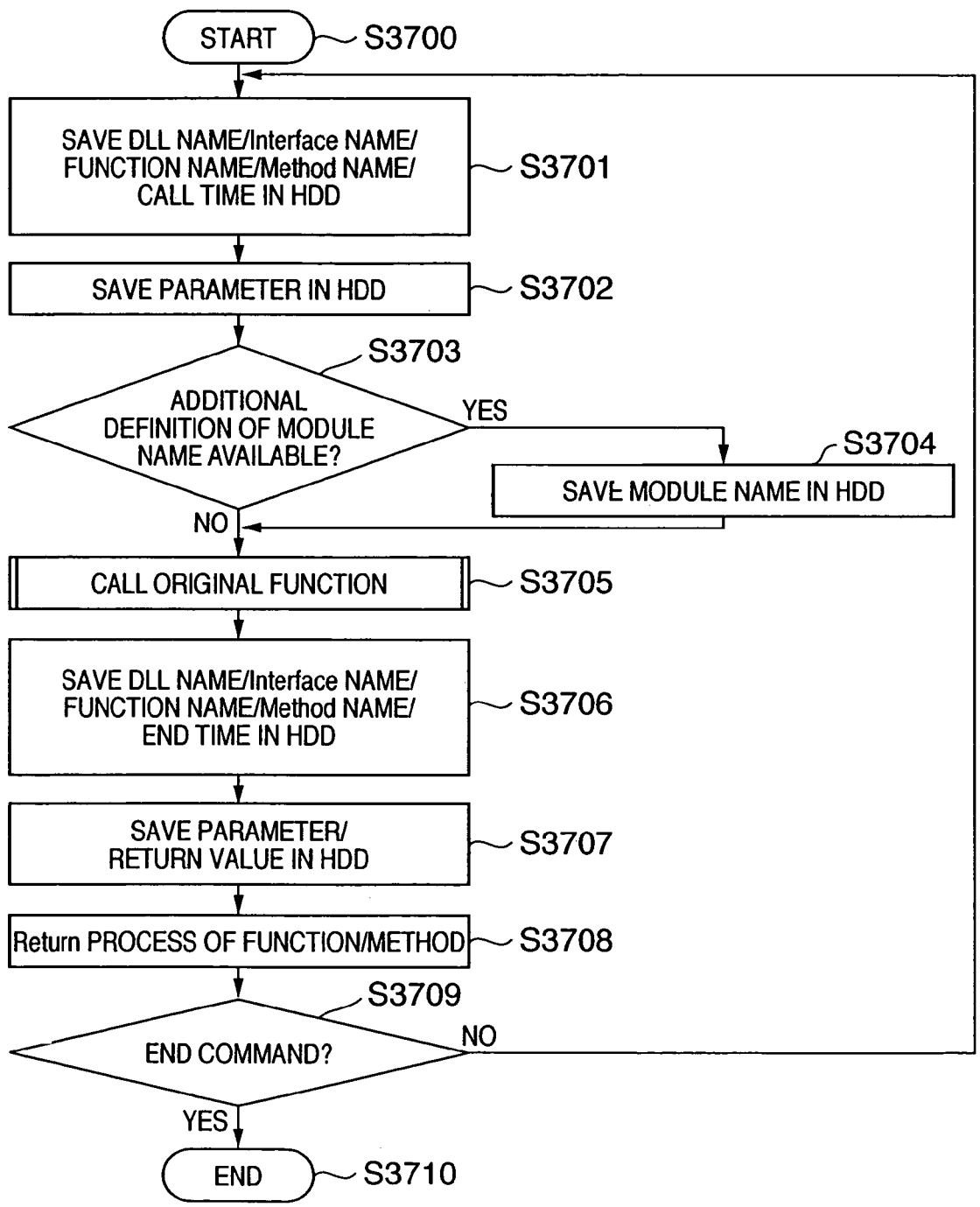

LOG ACQUISITION METHOD AND ITS CONTROL PROGRAM AND STORAGE MEDIUM

FIELD OF THE INVENTION

The present invention relates to a technique for acquiring processing logs of software divided into a plurality of modules.

BACKGROUND OF THE INVENTION

Conventionally, to take a measure against software errors with low repeatability, processing logs of the software are acquired and analyzed to learn the causes of errors (e.g., see Japanese Patent Laid-Open No. 11-296415).

However, the conventional processing log acquisition method suffers the following problems.

(1) In order to continuously acquire processing logs even in a user's operation environment, software modules themselves must be modified to add a processing log acquisition routine, and the process for acquiring the processing logs imposes a heavy load.

(2) Since the processing logs are acquired for respective modules, the generated processing logs are those for respective modules, and it is difficult to accurately acquire processing logs of the whole software in a chronological order. For this reason, the acquired processing logs have poor prospect for the whole software, and a large number of processes are required until the processing logs are analyzed to find out the causes of errors.

SUMMARY OF THE INVENTION

The present invention has been made in consideration of the above problems, and has as its object to provide a log acquisition method which can easily acquire processing logs of software divided into a plurality of modules, and can reduce the number of processes required to analyze the causes of software errors, a program for making a computer implement the method, and a storage medium storing that program.

In order to achieve the above object, a log acquisition method according to the present invention comprises the following arrangement. That is, there is provided a log acquisition method for acquiring a log during execution of a program which comprises functions that execute predetermined processes, comprising:

a step of identifying a designated function of functions in an operating system, which are called upon execution of the program; and a step of rewriting addresses of the loaded functions that execute the predetermined processes, and an address of the designated function in the operating system to an address of a function for log acquisition, and the function for log acquisition, comprising:

a step of calling the functions that execute the predetermined processes and the designated function in the operating system, making the functions execute the predetermined processes, and passing a received execution result to the program;

a step of recording predetermined information upon calling the functions that execute the predetermined processes and the designated function in the operating system; and a step of recording predetermined information upon receiving the execution result.

According to the present invention, processing logs of software divided into a plurality of modules can be easily acquired, and the number of processes required to analyze the causes of software errors can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A is a diagram showing the state of the software evaluation system that implements the log acquisition method according to the first embodiment of the present invention upon using IAT Patch;

FIG. 10 shows an example of a function definition file that instructs the formats of parameters and return values of respective functions and methods to the software evaluation system;

FIG. 11 shows an example of logs acquired by the software evaluation system that implements the log acquisition method according to the first embodiment of the present invention;

FIG. 15A shows an example of processing logs acquired by the software evaluation system that implements the log acquisition method according to the second embodiment of the present invention;

FIG. 15B shows an example of processing logs which are acquired when it is scheduled to acquire processing logs even upon calling functions in DLL of an OS part;

FIG. 18 shows an example of function definition of the software evaluation system, which is described in prevalently used IDL;

FIG. 19 shows a function definition file of the software evaluation system, which is described in IDL;

FIG. 22 shows log data acquired based on the definition in FIG. 19;

FIG. 23 shows a function definition file of the software evaluation system that implements the log acquisition method according to the third embodiment of the present invention;

FIG. 26 shows log data acquired based on the definition in FIG. 18;

FIG. 27 shows an example of a function definition file that instructs the formats of parameters and return values of respective functions and methods to the software evaluation system;

FIG. 28 shows an example of a function definition file that defines an interface type designated as riid in the software evaluation system;

FIG. 30 shows an example of processing logs acquired by the process shown in FIG. 29;

FIG. 32 is a flow chart showing the flow of the process in the software evaluation system that implements the log acquisition method according to the fourth embodiment of the present invention;

FIG. 33 shows an example of processing logs acquired by the process show in FIGS. 31 and 32;

FIG. 34 shows an example of function definition of a software evaluation system that implements a log acquisition method according to the fifth embodiment of the present invention;

FIG. 36 shows an example wherein a module name is defined in correspondence with an interface name; and FIG. 37 is a flow chart showing the flow of the process in the software evaluation system that implements a log acquisition method according to the fifth embodiment of the present invention.

DETAILED DESCRIPTION OF THE PREFERRED EMBODIMENTS

Preferred embodiments of the present invention will now be described in detail in accordance with the accompanying drawings.

First Embodiment

This embodiment can acquire the overall processes of software as processing logs in a chronological order without modifying software modules themselves by hooking function calls among modules and recording them in the processing logs using an import function address or virtual function address table (Virtual Address Table) as a mechanism used when a given module calls a function present in another module. This embodiment will be described in detail below.

<System Arrangement>

Figure 1:
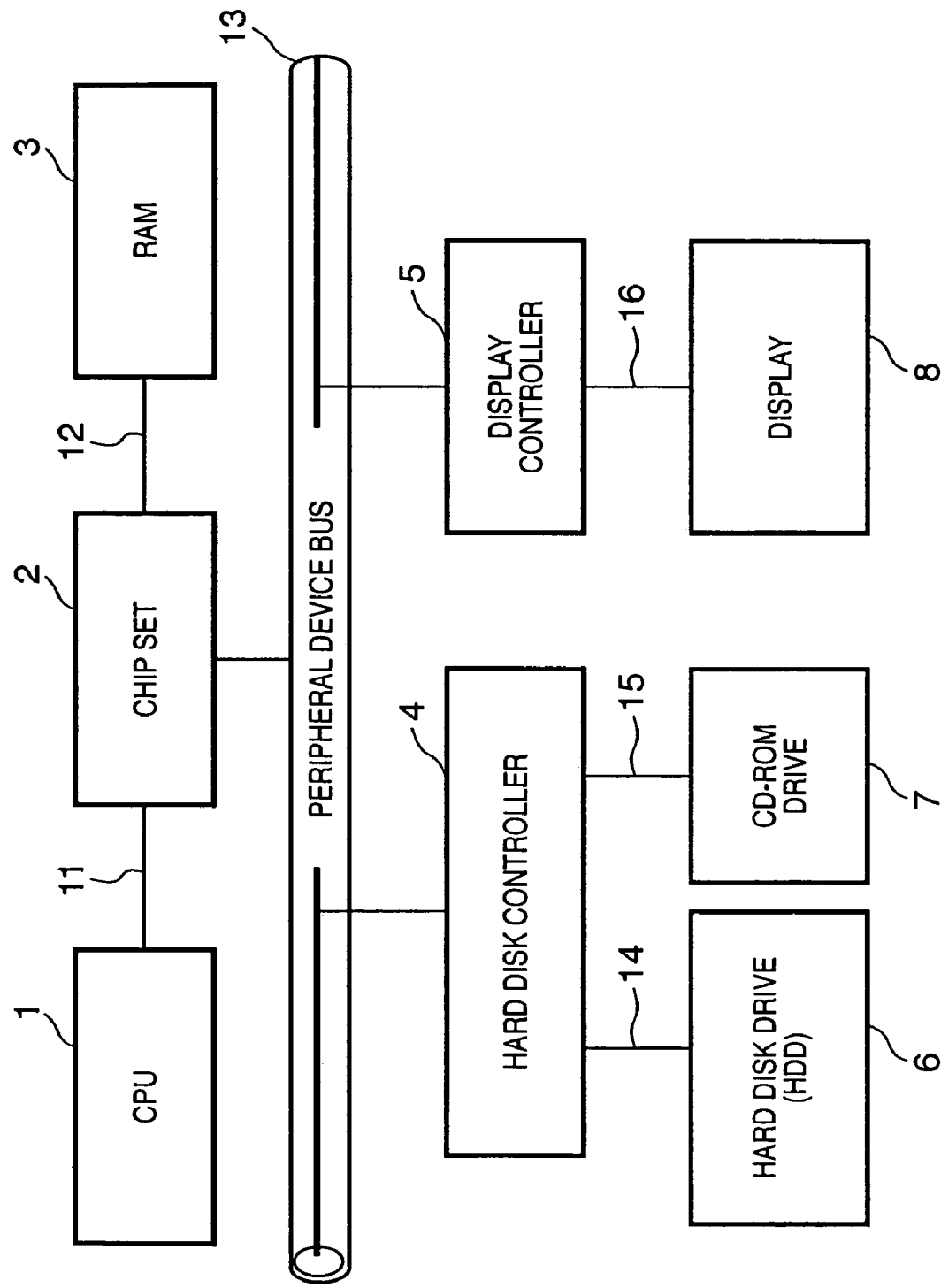
FIG. 1 is a block diagram showing the arrangement of a computer (software evaluation system) that implements a log acquisition method according to the first embodiment of the present invention.

FIG. 1 is a block diagram showing the arrangement of a computer (software evaluation system) that implements a log acquisition method according to each of preferred embodiments of the present invention. For the sake of simplicity, the software evaluation system is built in a single PC in this embodiment. However, the log acquisition method according to the present invention is effective independently of whether the system is built in a single PC or is built in a plurality of PCs as a network system.

The software evaluation system that implements the log acquisition method of this embodiment comprises a CPU 1, chip set 2, RAM 3, hard disk controller 4, display controller 5, hard disk drive 6, CD-ROM drive 7, and display 8. Also, the system comprises a signal line 11 that connects the CPU 1 and chip set 2, a signal line 12 that connects the chip set 2 and RAM 3, a peripheral device bus 13 that connects the chip set 2 and various peripheral devices, a signal line 14 that connects the hard disk controller 4 and hard disk drive 6, a signal line 15 that connects the hard disk controller 4 and CD-ROM drive 7, and a signal line 16 that connects the display controller 5 and display 8.

<Processing Log Acquisition for Function Process>

In order to explain the process in the software evaluation system that implements the log acquisition method according to the first embodiment of the present invention, a normal loading state of software divided into a plurality of modules onto a memory will be described first using FIG. 2.

Normally, software divided into a plurality of modules is divided into an execution file EXE (23) that makes the overall control, and a dynamic link library DLL (27) which is present as a module and plays a complementary role of EXE, and both EXE and DLL are loaded onto a memory. EXE consists of a code segment (28), data segment (29) and import address table (22). Furthermore, the import address table (22) is divided depending on DLLs to which functions belong (21, 24), and describes the load addresses of functions for respective DLLs (30 to 35). Instances of the functions of the DLLs are separately loaded for respective DLLs (25, 26), and respective functions are loaded as parts of corresponding DLLs (36 to 41). In FIG. 2, one EXE uses functions in two dynamic link libraries A.DLL and B.DLL, and six functions, that are, Func AA, Func AB, Func AC, Func BA, Func BB, and Func BC, are actually used.

When a code in the code segment of EXE calls function Func AA, the address (30) of Func AA written in the import address table (22) is read. The import address table describes the address of Func AA code (36) loaded as a part of A.DLL in practice, and the code of EXE can call Func AA of A.DLL by calling that address.

Figure 2:
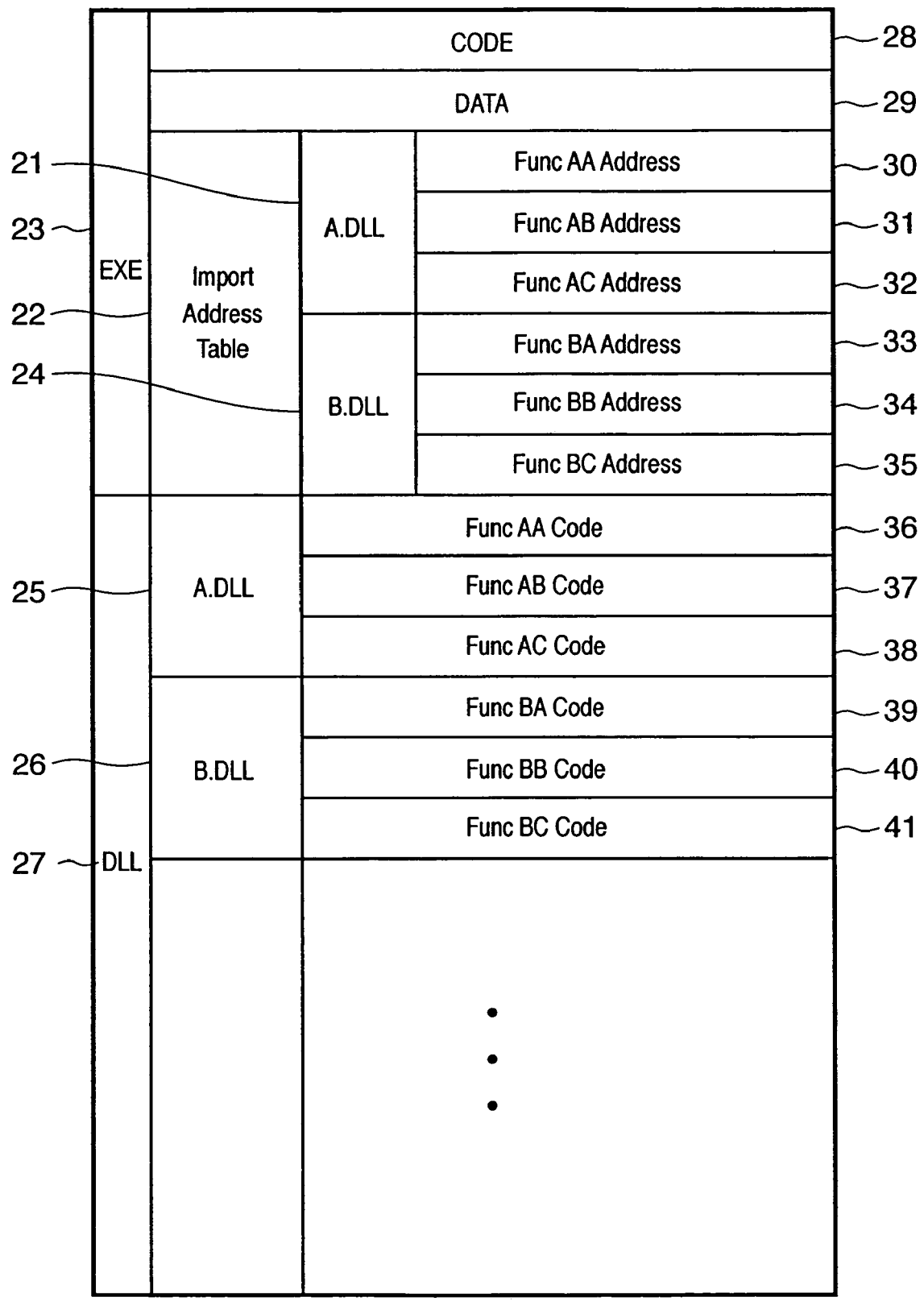
FIG. 2 shows a normal memory configuration upon loading functions.
Figure 3:
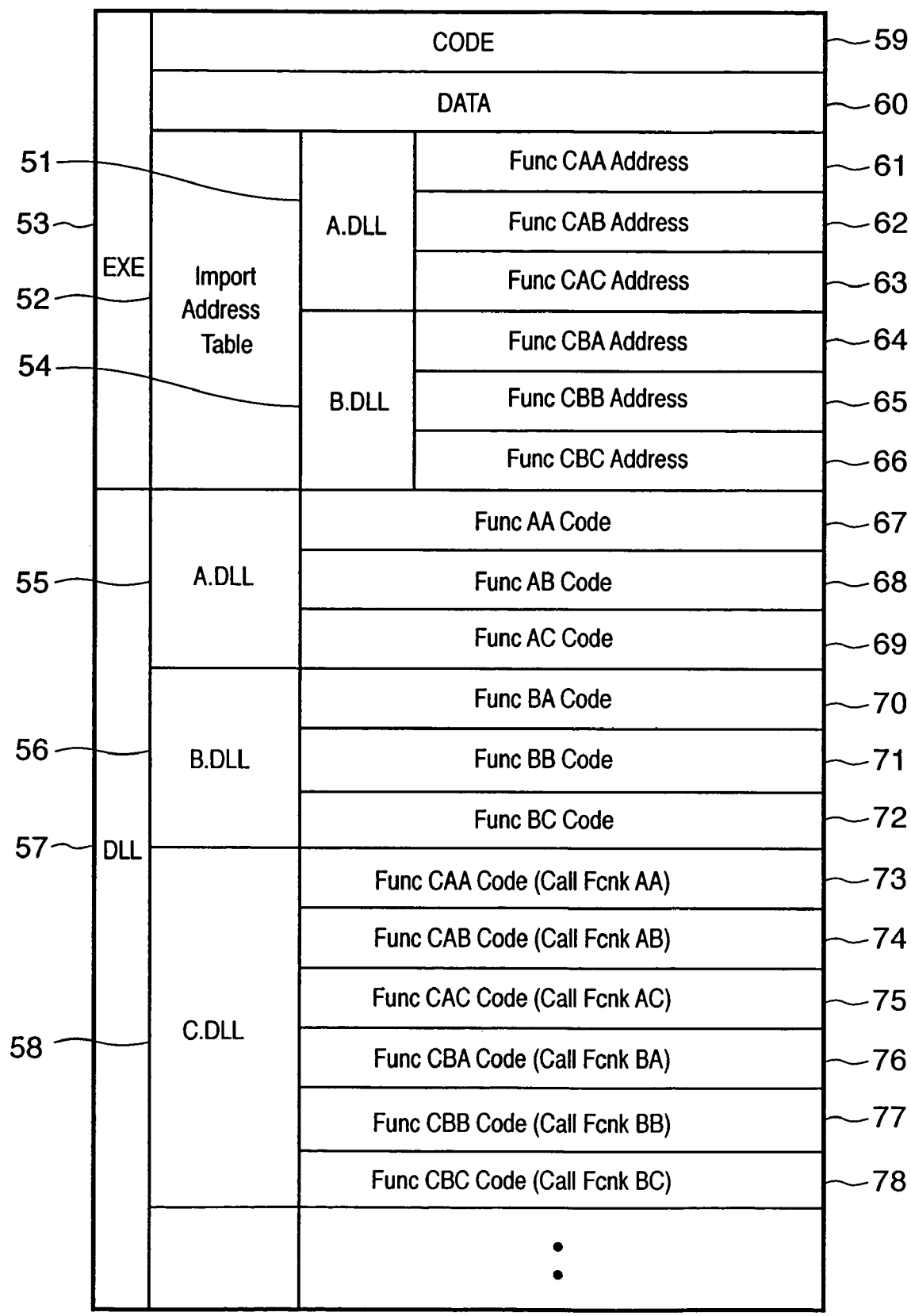
FIG. 3 shows the memory configuration of the software evaluation system that implements the log acquisition method according to the first embodiment of the present invention upon using IAT Patch.

FIG. 3 shows the memory configuration of the software evaluation system that implements the log acquisition method according to the first embodiment of. the present invention, and is different from FIG. 2 in that function call is redirected using a scheme called IAT Patch (Import Address Table Patch) for a log acquisition code.

When log acquisition starts, C.DLL (58) as DLL for IAT Patch is loaded onto the memory. C.DLL (58) rewrites the addresses of functions written in the import address table (52) to those of Func CAA, Func CAB, Func CAC, Func CBA, Func CBB, and Func CBC as log acquisition codes in C.DLL (58) (61 to 66). Codes (73 to 78) of Func CAA, Func CAB, Func CAC, Func CBA, Func CBB, and Func CBC in C.DLL (58) record logs and call Func AA, Func AB, Func AC, Func BA, Func BB, and Func BC (67 to 72), which are loaded onto the memory to receive original function calls.

Figure 4B:
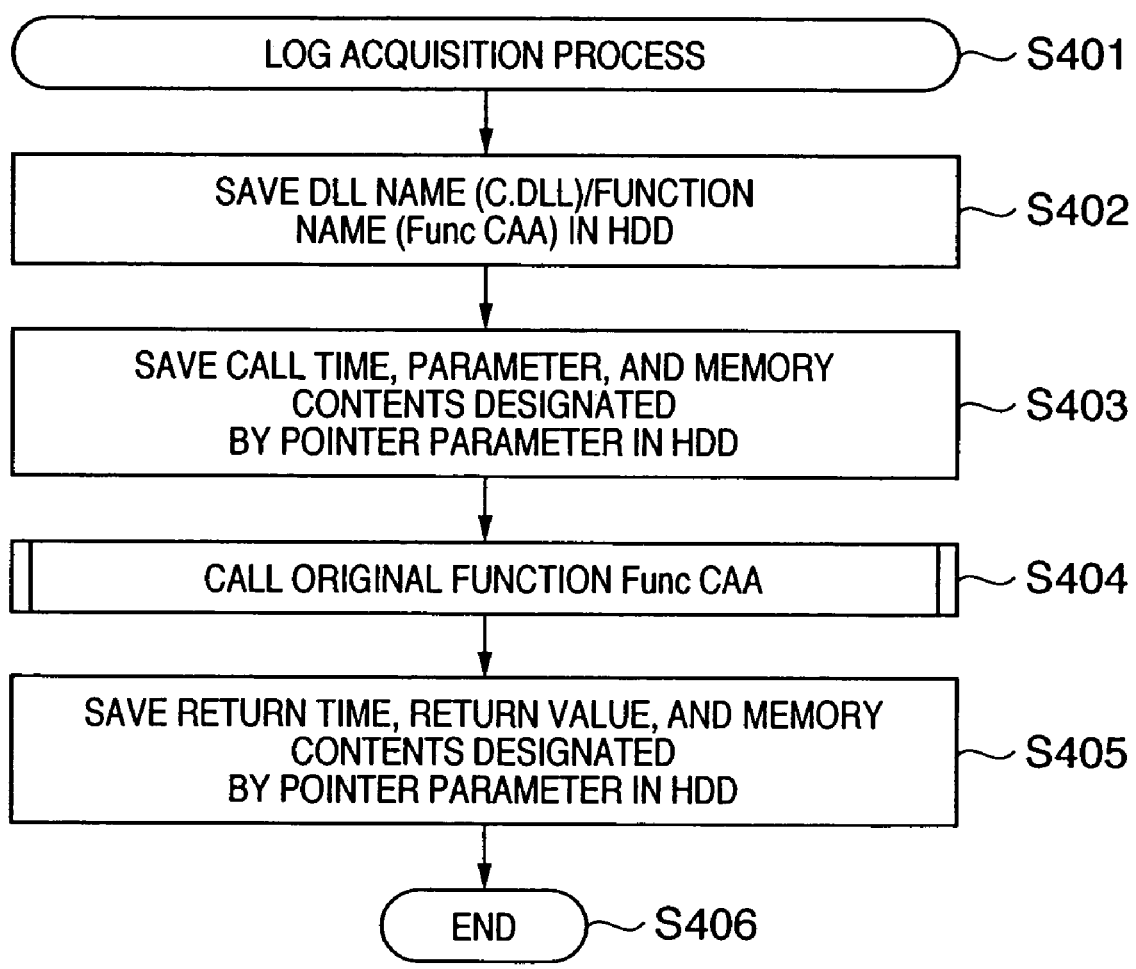
FIG. 4B is a flow chart showing a log acquisition process of the software evaluation system that implements the log acquisition method according to the first embodiment of the present invention.

FIG. 4A shows the process of IAT Patch in FIG. 3, and FIG. 4B is a flow chart showing the flow of the log acquisition process. FIGS. 4A and 4B show an example of the operation of a log acquisition code by IAT Patch when EXE calls Func AA in A.DLL (55), for the sake of simplicity.

When EXE (91 in FIG. 4A) calls Func AA (94 in FIG. 4A), a log acquisition call in C.DLL (58) saves DLL name (C.DLL)/function name (Func AA) in a memory (step S402 in FIG. 4B), saves the call time in the memory, saves parameters upon calling in the memory, and saves memory contents designated by a pointer parameter upon calling in another memory (95 in FIG. 4A, step S403 in FIG. 4B). After that, C.DLL calls Func AA in A.DLL (93 in FIG. 4A) which is to be originally called (96 in FIG. 4A, step S404 in FIG. 4B). If the Func AA process of A.DLL (97 in FIG. 4A) is complete, and the control returns to C.DLL (98 in FIG. 4A), C.DLL saves the return time in the memory, saves a return value in the memory, and memory contents designated by the pointer parameter upon return in another memory (99 in FIG. 4A). C.DLL writes saved log information in a file (100 in FIG. 4A, step S405 in FIG. 4B), and the control returns to EXE as if Func AA of A.DLL terminated normally (101).

Figure 5:
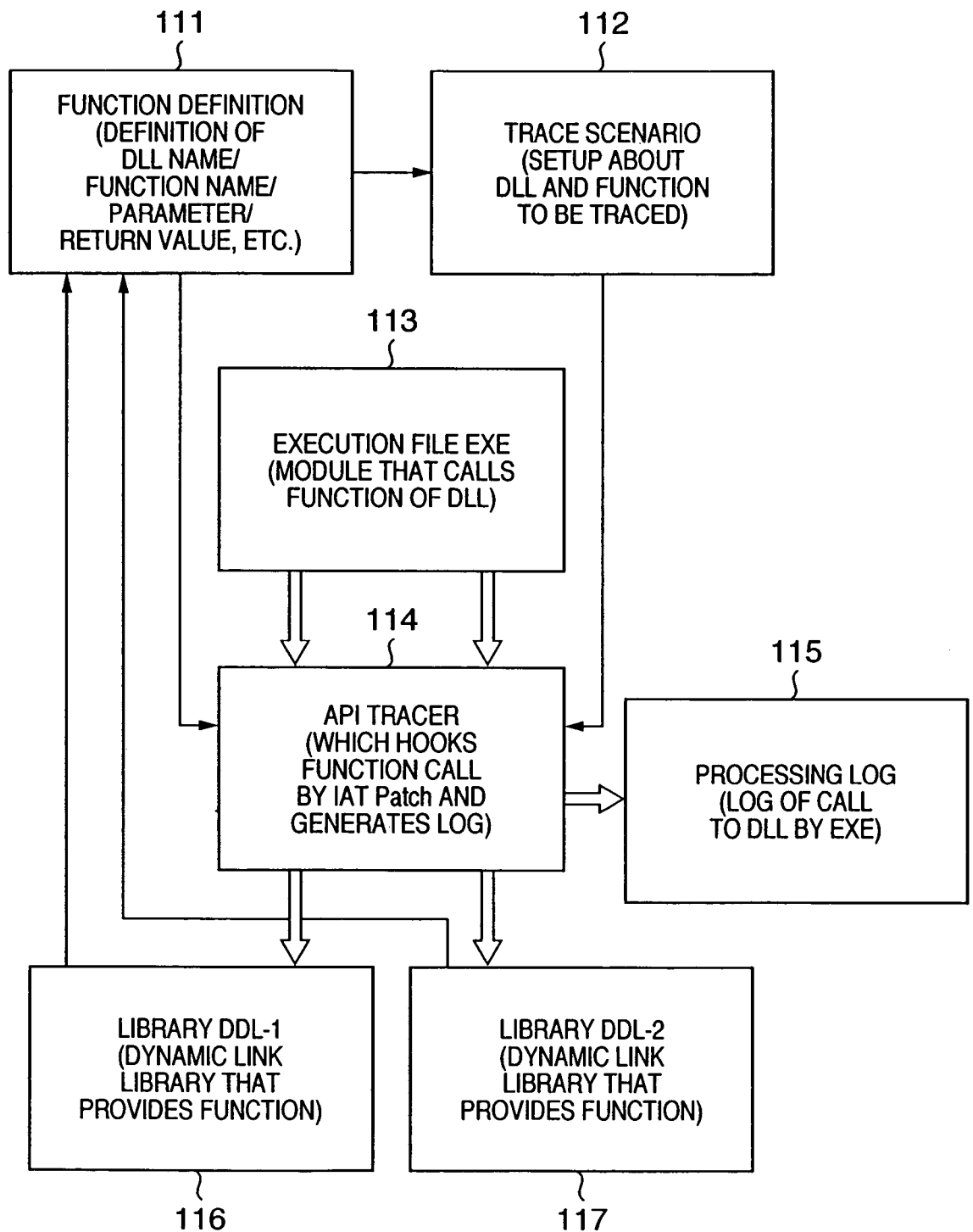
FIG. 5 is a diagram showing the internal arrangement of the software evaluation system that implements the log acquisition method according to the first embodiment of the present invention upon using IAT Patch.

FIG. 5 is a diagram showing the functional arrangement of the software evaluation system that implements the log acquisition method according to the first embodiment of the present invention. Normally, an execution file EXE (113) calls functions in DLL-1 (116) and DLL-2 (117). However, in this case, a log acquisition code called an API tracer is embedded (114) to generate processing logs (115). The API tracer runs based on a file (111) that describes function definitions of DLL-1 and DLL-2, and a setting scenario (trace scenario) which designates a DLL and function, the import address table of which is to be rewritten upon acquiring a log.

<Processing Log Acquisition for Method Process>

In order to explain the loading state of an execution file EXE onto a memory upon creating instances of interfaces exported by a COM (Component Object Model) server in the software evaluation system that implements the log acquisition method according to the first embodiment, the normal loading state of EXE on the memory will be explained first using FIG. 6.

Normally, upon creating instances of interfaces, the requested interfaces (121, 122) and their methods (programs that describe procedures to be executed by objects in object-oriented programming, 130 to 135) are created in the COM server, and both of them are loaded onto a memory. Virtual address tables are prepared in correspondence with the created interfaces (118, 120), and are passed to EXE that issued a creation request. Each virtual address table describes creation addresses of the methods (124 to 129). EXE calls the respective interface using these pieces of information. FIG. 5 exemplifies a case wherein one EXE creates instances of two interfaces, that are, Interface A and Interface B, and uses methods in these interfaces, and Method AA, Method AB, Method AC, Method BA, Method BB, and Method BC are actually used.

When a code of EXE calls function Method AA, the address (124) of Method AA written in the virtual address table is read. This table describes the address of Method AA code (130) which is created as a part of Interface A of the COM server in practice, and the code of EXE can call Method AA of Interface A by calling that address.

Figure 6:
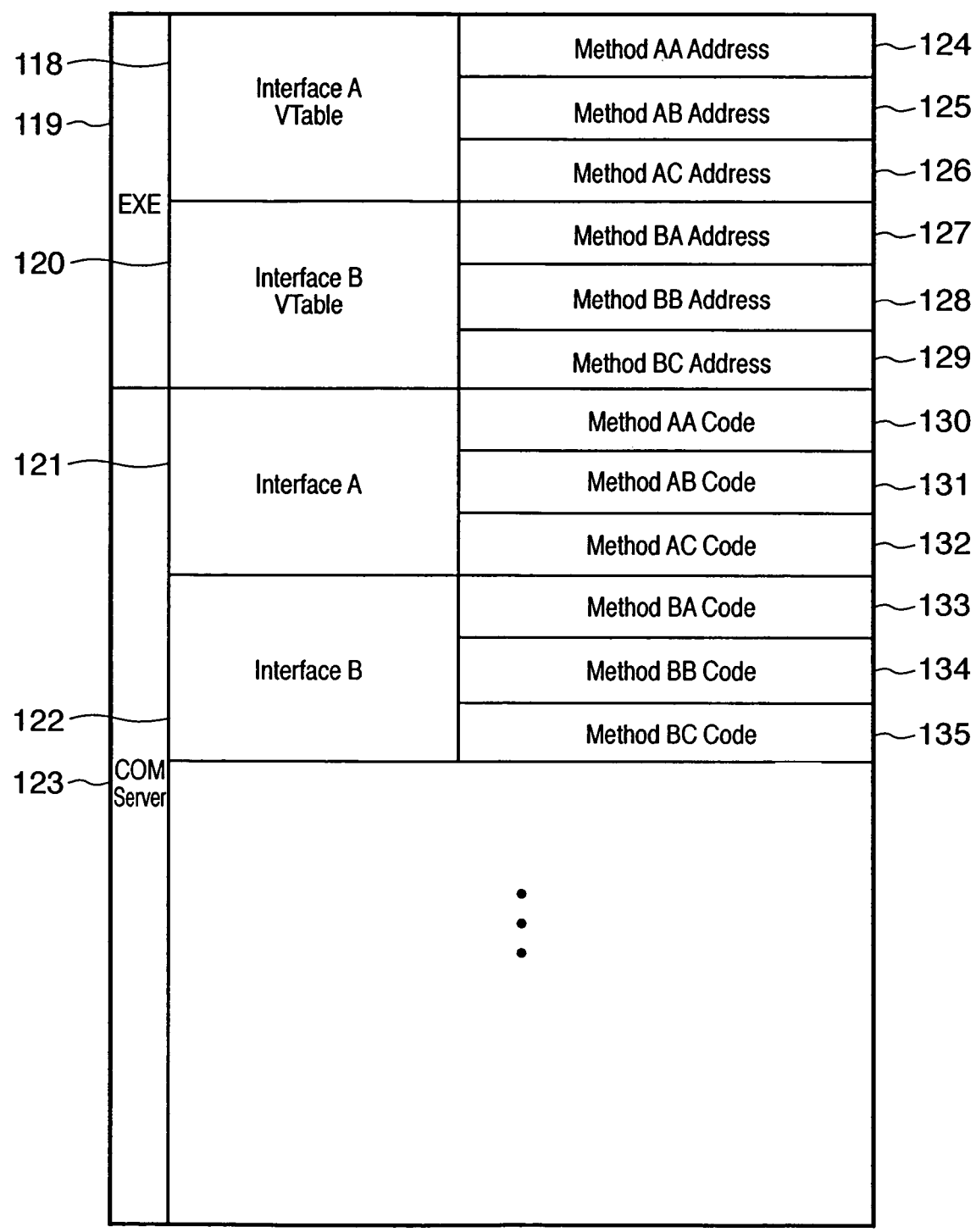
FIG. 6 shows a normal memory configuration upon creating instances of interfaces of a COM server.
Figure 7:
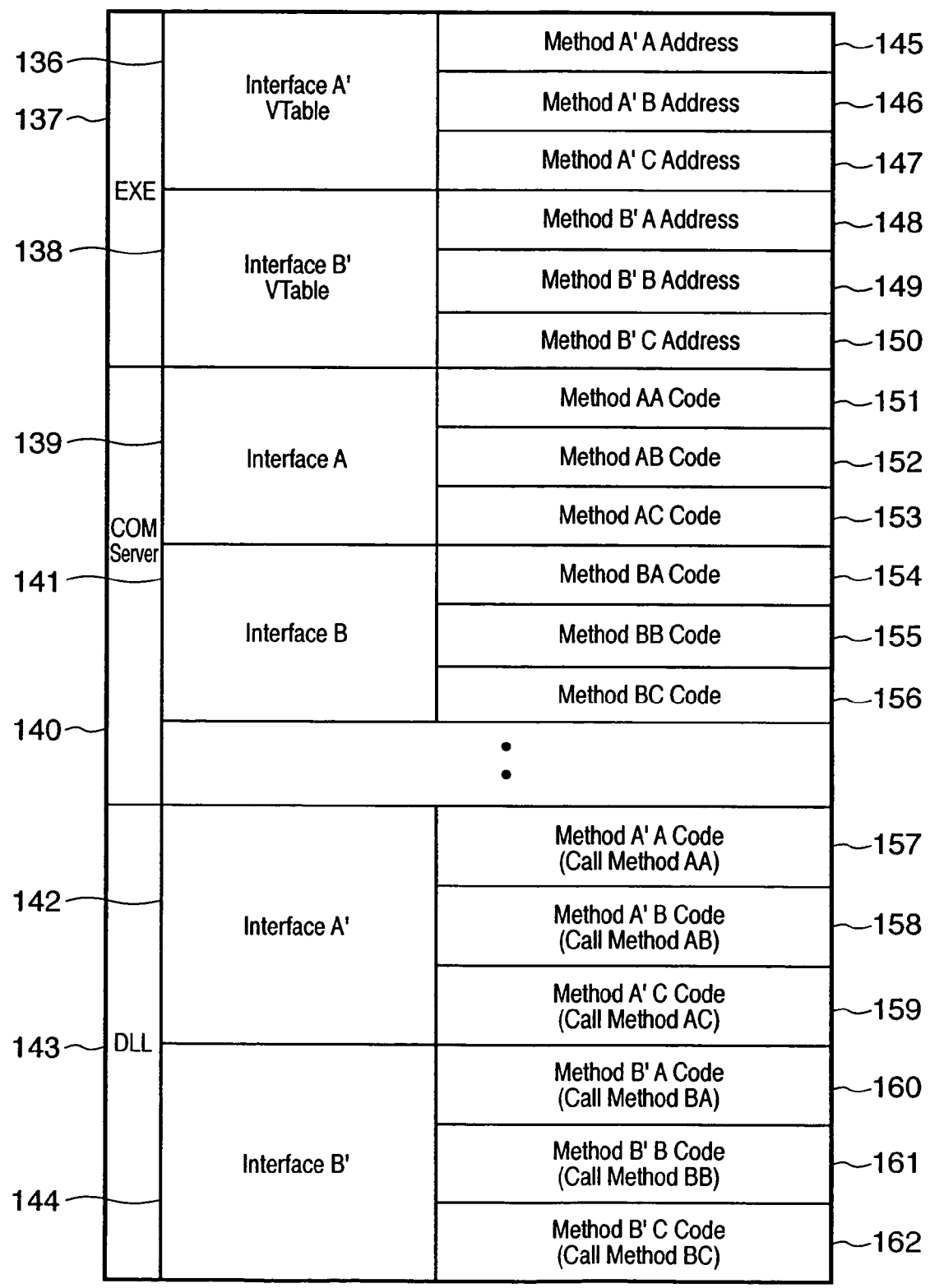
FIG. 7 shows the memory configuration of the software evaluation system that implements the log acquisition method according to the first embodiment of the present invention upon using VTable Patch.

FIG. 7 shows the memory configuration of the software evaluation system that implements the log acquisition method according to the first embodiment of the present invention, and is different from FIG. 6 in that method call is redirected using a scheme called VTable Patch (virtual address table Patch) for a log acquisition code.

When log acquisition starts, DLL (143) for VTable Patch is loaded onto the memory. This DLL rewrites the addresses of methods written in virtual address tables (136, 138) to those of Method A'A, Method A'B, Method A'C, Method B'A, Method B'B, and Method B'C as log acquisition codes in DLL (145 to 150). Codes (157 to 162) of Method A'A, Method A'B, Method A'C, Method B'A, Method B'B, and Method B'C in DLL record logs and call Method AA, Method AB, Method AC, Method BA, Method BB, and Method BC (157 to 162) as corresponding methods.

Figure 8A:
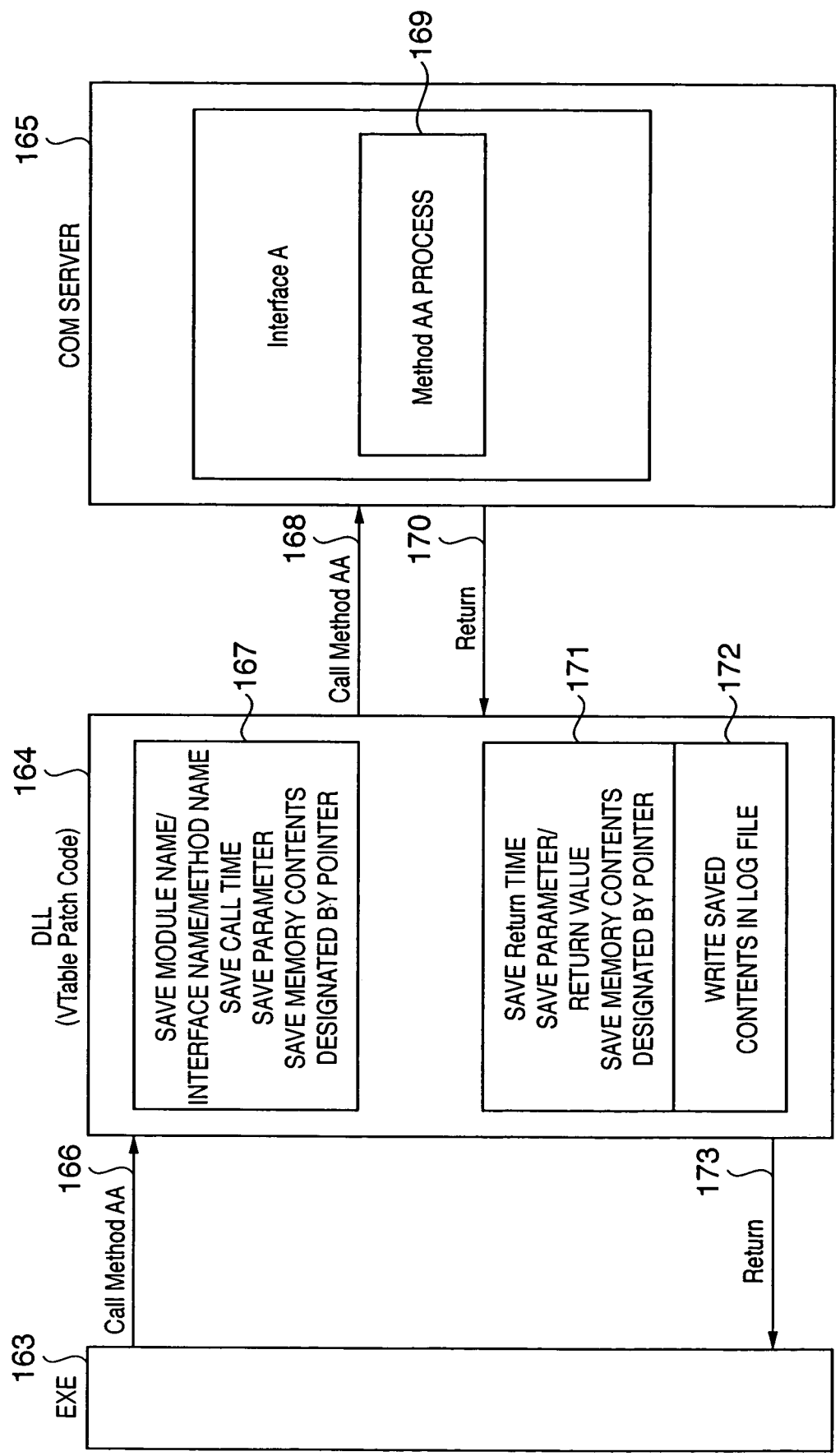
FIG. 8A is a diagram showing the state of the software evaluation system that implements the log acquisition method according to the first embodiment of the present invention upon using VTable Patch.
Figure 8B:
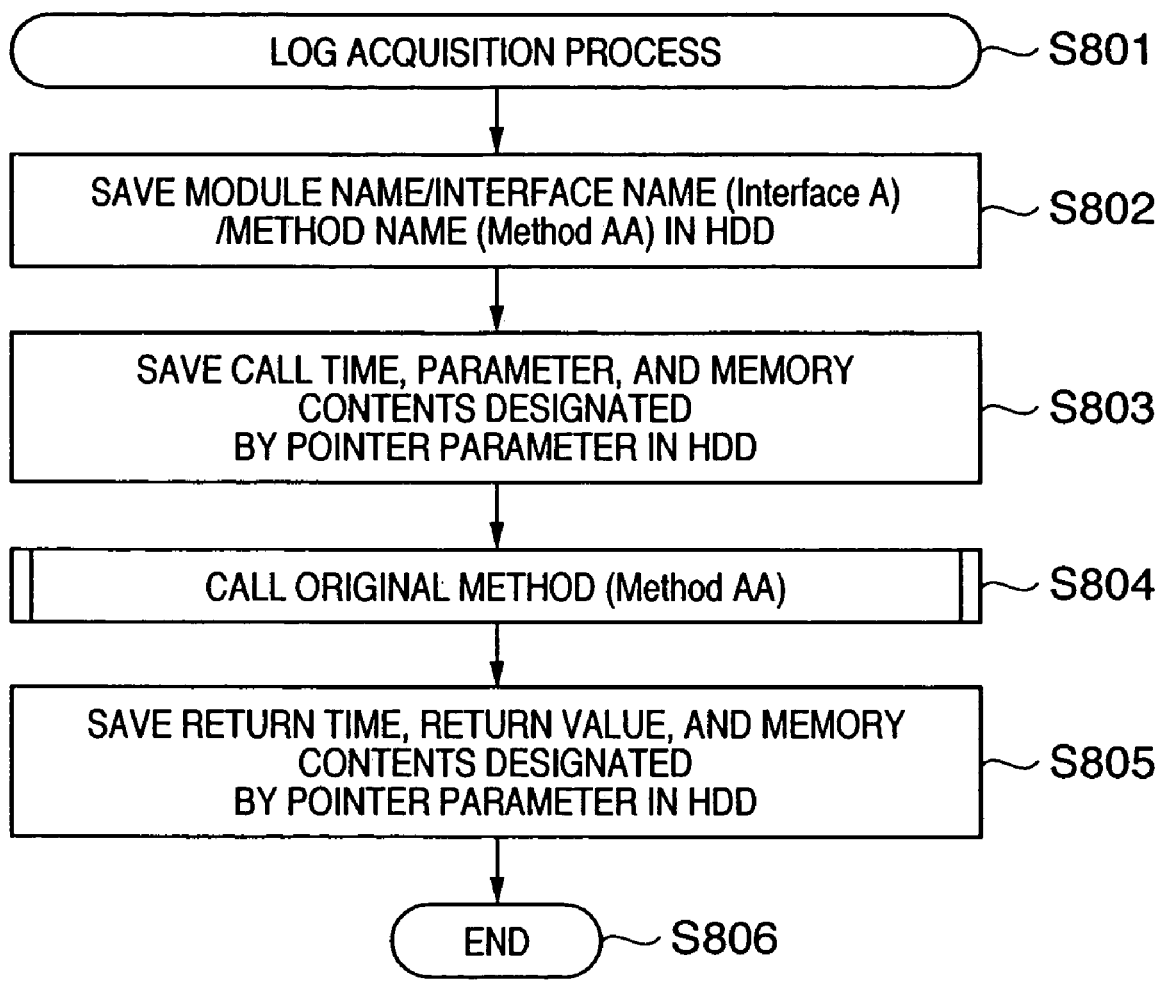
FIG. 8B is a flow chart showing the flow of a log acquisition process of the software evaluation system that implements the log acquisition method according to the first embodiment of the present invention.

FIG. 8A is a diagram showing the process of VTable Patch in FIG. 7, and FIG. 8B is a flow chart showing the flow of the log acquisition process. FIGS. 8A and 8B show an example of the operation of a log acquisition code by VTable Patch when EXE calls Method AA of Interface A in the COM server, for the sake of simplicity.

When EXE (163 in FIG. 8A) calls Method AA (166 in FIG. 8A), a log acquisition code in DLL saves module name/interface name/method name in a memory (step S802 in FIG. 8B), saves the call time in the memory, saves parameters upon calling in the memory, and saves memory contents designated by a pointer parameter upon calling in another memory (167 in FIG. 8A, step S803 in FIG. 8B). After that, DLL calls Method AA in the COM server (165 in FIG. 8A) which is to be originally called (168 in FIG. 8A, step S804 in FIG. 8B). If the Method AA process (169 in FIG. 8A) of the COM server is complete, and the control returns to DLL (170 in FIG. 8A), DLL saves the return time in the memory, saves a return value in the memory, and saves memory contents designated by a pointer parameter upon return in another memory (171 in FIG. 8A). After that, DLL writes saved log information in a file (172 in FIG. 8A, step S805 in FIG. 8B), and the control returns to EXE (173 in FIG. 8A) as if Method AA of the COM server terminated normally.

Figure 9:
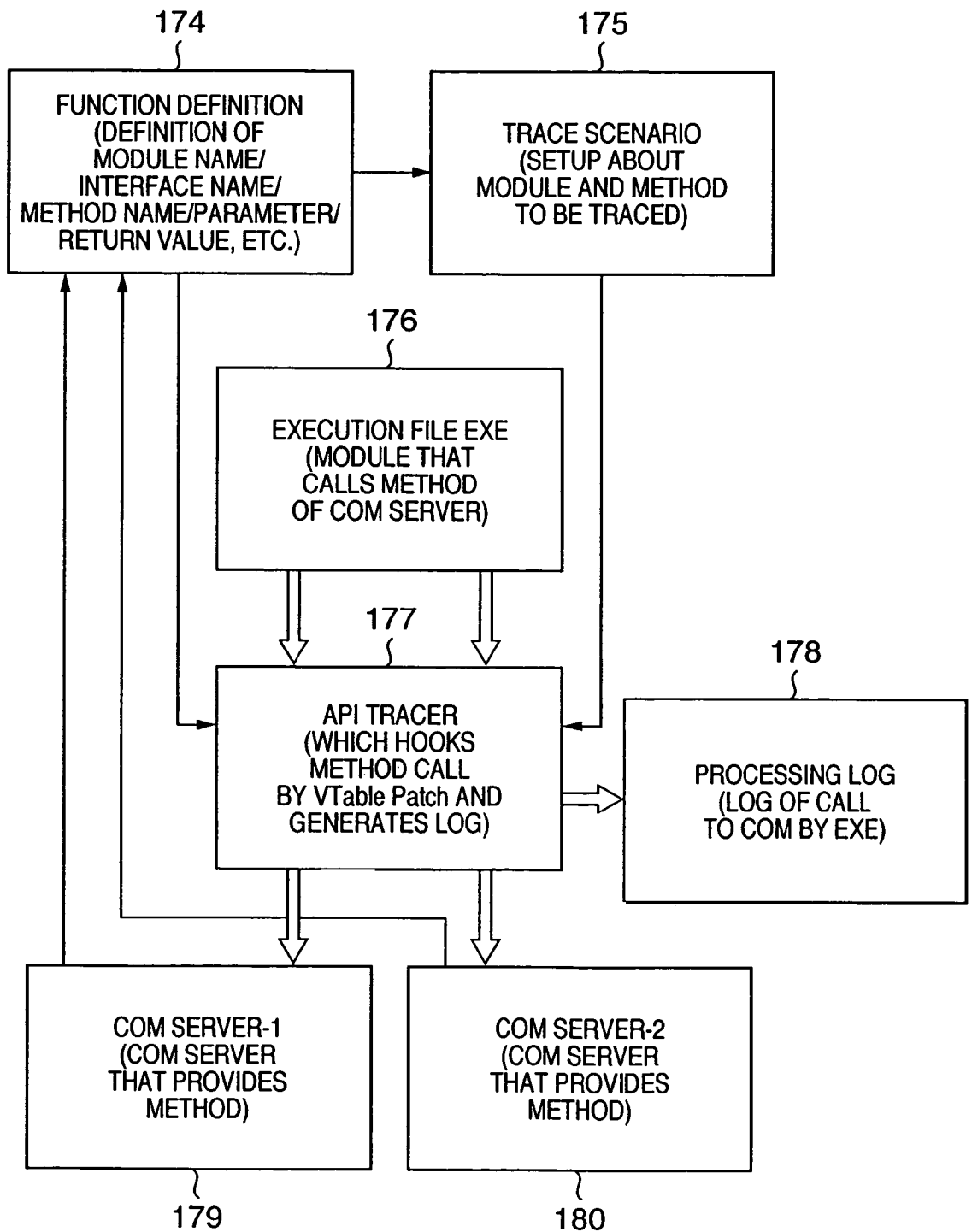
FIG. 9 is a diagram showing the internal arrangement of the software evaluation system that implements the log acquisition method according to the first embodiment of the present invention.

FIG. 9 is a diagram showing the functional arrangement of the software evaluation system that implements the log acquisition method according to the first embodiment of the present invention. Normally, an execution file EXE (176) calls methods in COM server 1 (179) and COM server 2 (180). However, in this case, a log acquisition code called an API tracer is embedded (177) to generate processing logs (178). The API tracer runs based on a file (174) that describes function definitions of COM server 1 (179) and COM server 2, and a setting scenario (trace scenario) which designates a COM server, interface, and method, the virtual address table of which is to be rewritten upon acquiring a log.

Embodiment

FIG. 10 shows an example of a function definition file that instructs the formats of parameters and return values of respective functions and methods to the software evaluation system which implements the log acquisition method according to the first embodiment of the present invention. The file describes DLL/interface names and function/method names ("function/method" means "function or method"; the same applies to the following description), and also parameter and return value types corresponding to these functions/methods. The software evaluation system that implements the log acquisition method according to this embodiment determines parameters/return values of respective functions/methods based on the contents instructed by this function definition file, and acquires their contents as logs.

FIG. 11 shows an example of logs acquired by the software evaluation system according to the embodiment of the present invention using the function definition file shown in FIG. 10. Times (In time, Out time) at which functions/methods were called in response to respective calls and parameters/return values at that time are generated as a log.

As can be seen from the above description, according to the log acquisition method of this embodiment, upon acquisition of processing logs of software divided into a plurality of modules, calls of functions/methods prepared in modules can be recorded as processing logs without modifying modules themselves, and the load on the processing log acquisition process can be reduced. Also, the generated processing logs can be acquired as those in a chronological order, and allows its easy analysis, thus reducing the number of processes required to analyze causes of software errors.

Second Embodiment (Part 1)

In the first embodiment, processing logs of all functions/methods called by EXE are acquired. However, in such case, a huge number of processing logs may be acquired. Hence, this embodiment will explain a case wherein acquisition targets of processing logs of functions/methods called by EXE are limited.

Figure 12:
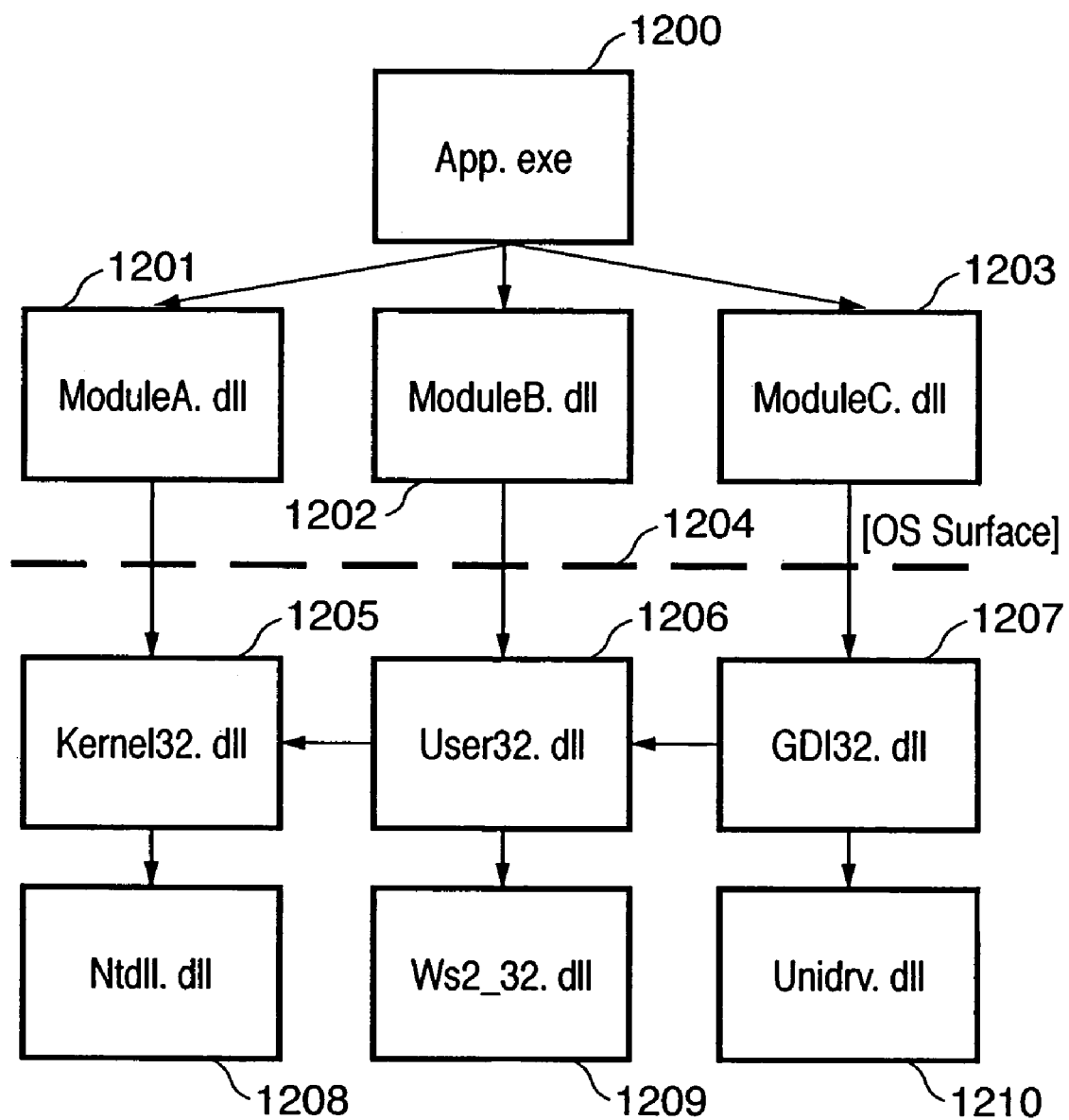
FIG. 12 is a diagram showing an example of the module configuration of general software.

In general, a software module configuration is divided into DLLs of an OS part and those of an application part by OS Surface. FIG. 12 shows an example of a general software module configuration. Referring to FIG. 12, reference numeral 1200 denotes APP.EXE; and 1201 to 1203, ModuleA.dll, ModuleB.dll, and ModuleC.dll, respectively, which are DLLs of the application part. On the other hand, reference numerals 1205 to 1210 respectively denote User32.dll, GdI32.dll, Ntdll.dll, Ws2_32.dll, and Unidrv.dll, which are DLLs of the OS part.

Hence, in this embodiment, acquisition targets of processing logs are limited by acquiring processing logs only when functions in DLLs of the application part in software with the above module configuration are called.

Figure 13:
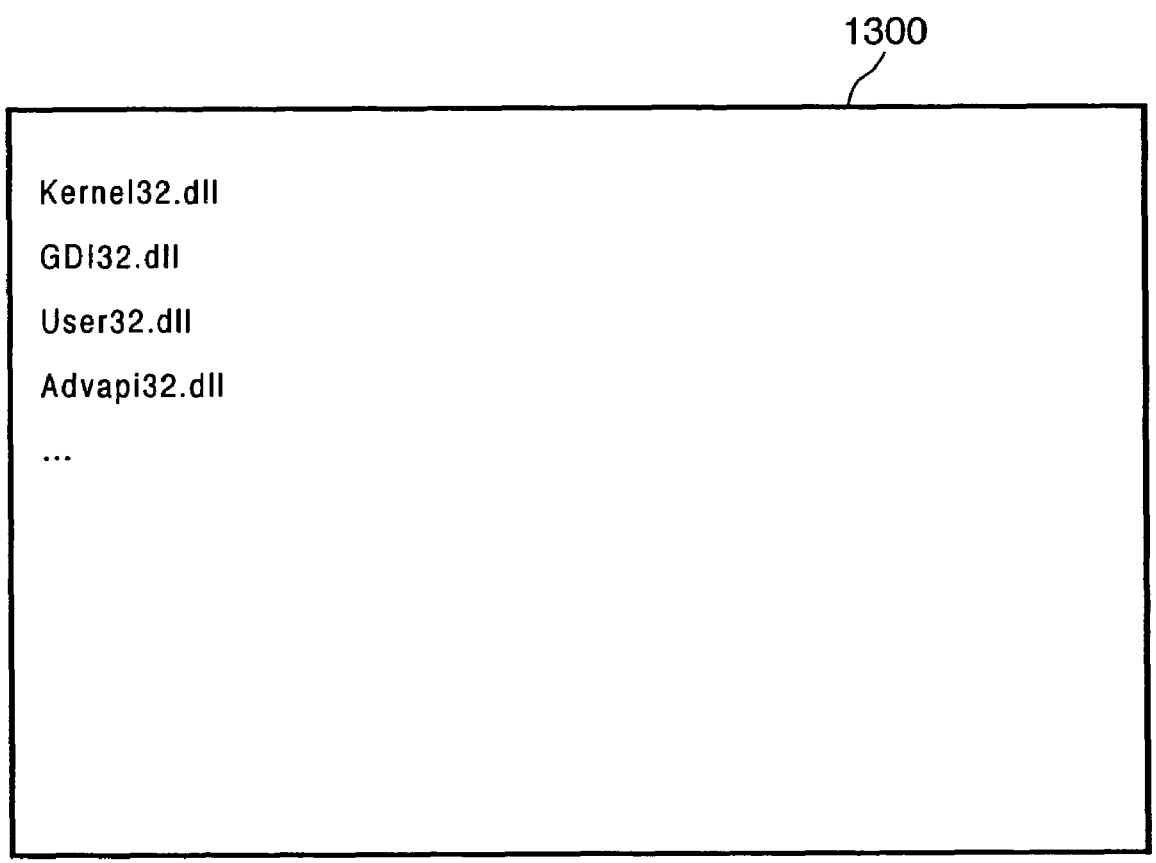
FIG. 13 shows an example of a file that defines modules of an operating system as acquisition targets of processing logs.

FIG. 13 shows an example of a file which defines modules of the operating system. Based on this module definition file, a process shown in FIG. 14 is done.

Figure 14:
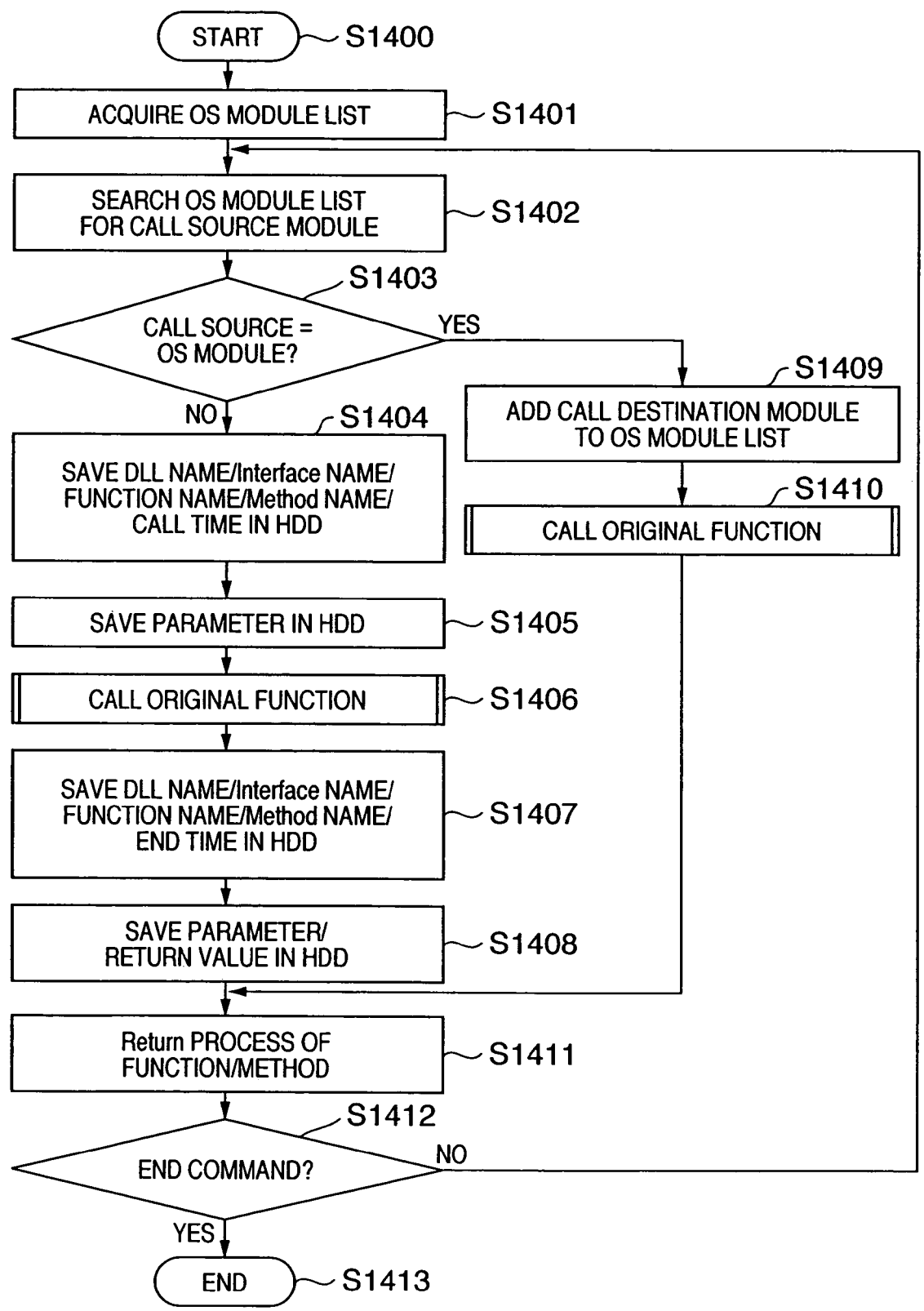
FIG. 14 is a flow chart showing the flow of the process in a software evaluation system that implements a log acquisition method according to the second embodiment of the present invention.

FIG. 14 is a flow chart showing the flow of a process in a software evaluation system that implements a log acquisition method according to the second embodiment of the present invention.

If the process starts in step S1400, a module definition file 1300 of the operating system shown in FIG. 13 is acquired, and an OS module list is held (step S1401). It is checked if a module as a function/method call source is included in that OS module list (steps S1402, S1403). If the module is included, the call destination module is merely added to the OS module list (step S1409), and an original function/method is called (step S1410). The process in step S1409 establishes means for, even when the function/method in the module is called, inhibiting acquisition of a processing log of that call.

On the other hand, if it is determined in step S1403 that the source module is not included in the OS module list, DLL name/interface name/function name/method name/call time are saved in an HDD (step S1404), and a parameter for that call is saved in the HDD (step S1405).

A function/method of an instance is called (step S1406). Upon completion of the process in the function/method, DLL name/interface name/function name/method name/end time are saved in the HDD (step S1407), and a parameter and return value for that call are saved in the HDD (step S1408). A return process of the function/method is executed (step S1411). This process is repeated until a program to be evaluated ends (step S1412).

FIG. 15A shows an example of processing logs acquired by the process shown in FIG. 14. Note that FIG. 15B shows an example of processing logs which are acquired when it is scheduled to acquire logs even when functions in DLLs of the OS part are called, for the sake of comparison. As can be seen from comparison between FIGS. 15A and 15B, since processing logs including those in the operating system (e.g., a call from Kernel132.dll to Ntdll.dll, or a call from User32.dll to Ws2_32.dll) are not acquired in FIG. 15A based on the module definition file 1300 of the operating system shown in FIG. 13, analysis can be made using processing logs with a smaller size.

As can be seen from the above description, according to this embodiment, by designating "the surface of the operating system" in a function definition file, processing logs of software can be appropriately acquired, and analysis such as identification of bug causes and the like can be attained.

Second Embodiment (Part 2)

The second embodiment (part 1) has exemplified a case wherein none of the processing logs of all modules below the surface of the operating system are acquired. In practice, processing logs of some modules (DLLs of the OS part) below the surface must be acquired in practice.

For example, a program (to be referred to as "log acquisition program" hereinafter) that implements the log acquisition method described in the first embodiment may be embedded in a driver SDK (SDK=Software Development Kit) when it is used.

In general, a driver SDK (e.g., printer SDK) is provided by a peripheral device manufacturer (printer manufacturer), but software (e.g., software used to create/edit documents or images to be printed by a printer) that uses the driver SDK is often created by another manufacturer. For this reason, when software does not normally run upon using the driver SDK (printer SDK), it is important to determine whether that error is caused by bugs on the driver SDK (printer SDK) side or software side. In such case, it is important that the log acquisition program acquires processing contents of the printer SDK as processing logs. For this purpose, acquisition of a processing log upon calling a function in a DLL of the OS part such as Unidrv.dll (1210) or the like must be scheduled.

That is, upon limiting the acquisition targets of processing logs, it is desirable to arbitrarily select them in accordance with the use purpose of the log acquisition program. In this embodiment, the log acquisition program that considers such point will be explained.

Figure 16:
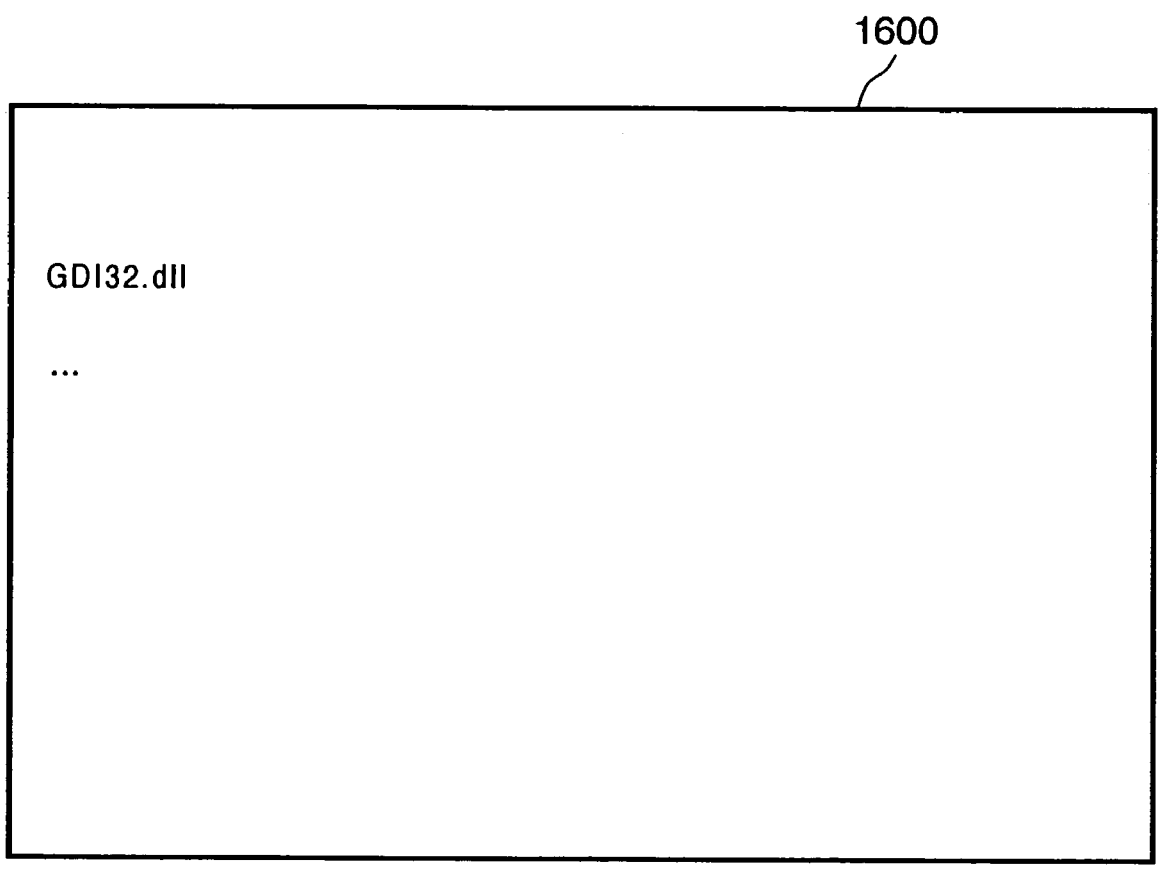
FIG. 16 shows an example of a file that defines exception modules of the operating system as the acquisition targets of processing logs.
Figure 17:
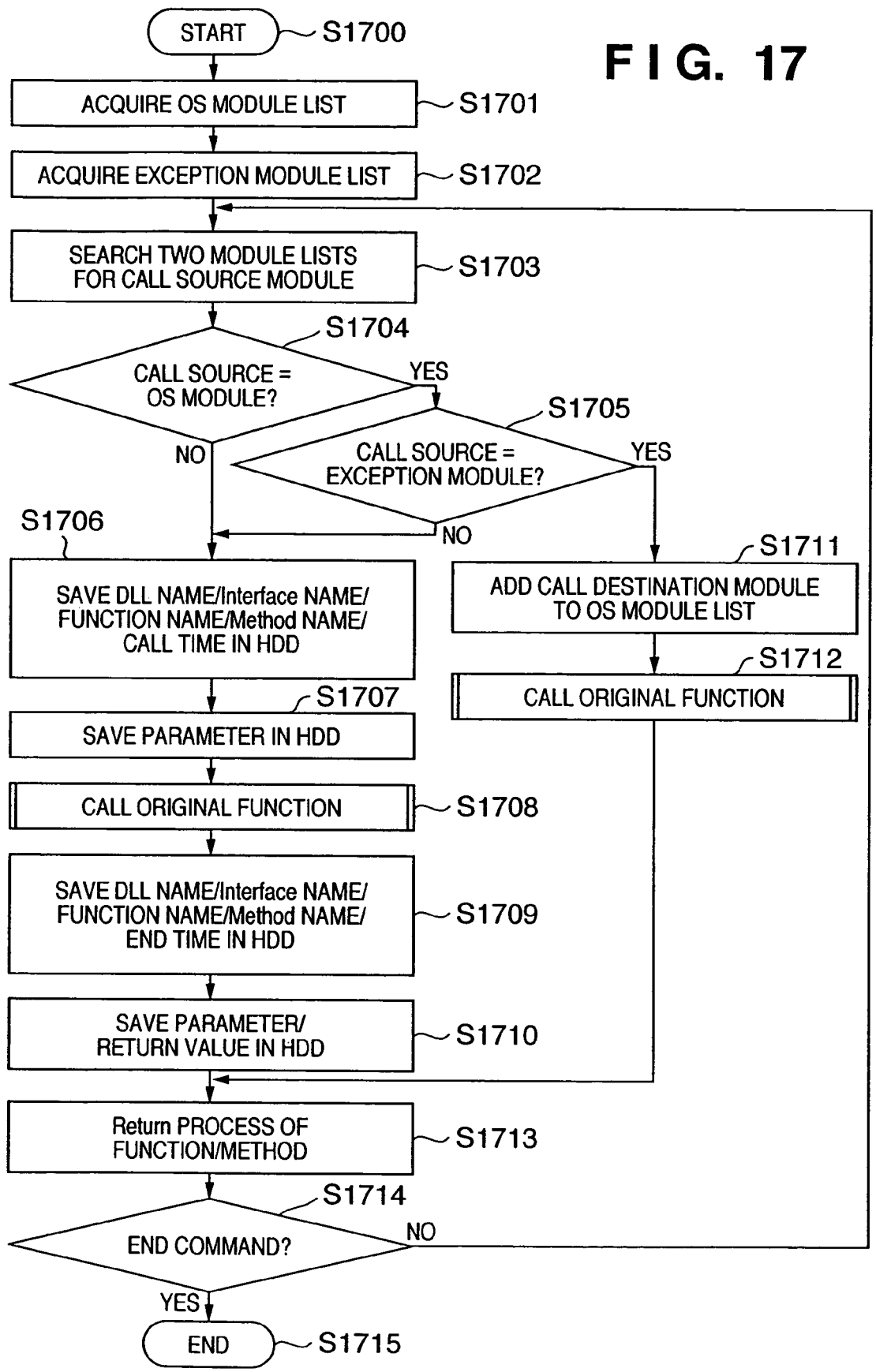
FIG. 17 is a flow chart showing the flow of the process in a software evaluation system that implements a log acquisition method according to the third embodiment of the present invention.

FIG. 16 shows an example of a file that defines exception modules of the operating system (modules to be excluded from those of the operating system, which are defined as modules from which no logs are to be acquired, that is, modules as log acquisition targets) in consideration of such necessity. A process shown in FIG. 17 is done based on this exception module definition file and the surface definition file shown in FIG. 13. In this embodiment, when the user designates exception from the surface, a processing log of the driver is acquired together with those of software in the aforementioned case.

FIG. 17 is a flow chart showing the flow of a process in the software evaluation system that implements the log acquisition method according to the second embodiment of the present invention.

If the process starts in step S1700, the module definition file 1300 of the operating system shown in FIG. 13 is acquired, and an OS module list is held (step S1701). Also, the exception module definition file shown in FIG. 16 is acquired, and an exception module list is held (step S1702). Then, both the OS module list and exception module list are searched to check if a module as a function/method call source is included in these lists (step S1703).

It is checked if the call source module is included in the OS module list (step S1704). If that module is included, it is checked if the call source is an exception module (step S1705). If that module is included in the OS module list but is not included in the exception module list, the log acquisition program of this embodiment merely adds the call destination module to the OS module list (step S1711), and calls an original function/method (step S1712).

If it is determined in step S1704 that the call source module is not included in the OS module list and if it is determined in step S1705 that the module is included in the exception module list, DLL name/interface name/function name/method name/call time are saved in the HDD (step S1706), and a parameter for that call is saved in the HDD (step S1707).

A function/method of an instance is called (step S1708). Upon completion of the process in the function/method, DLL name/interface name/function name/method name/end time are saved in the HDD (step S1709), and a parameter and return value for that call are saved in the HDD (step S1710). A return process of the function/method is executed (step S1713).

This process is repeated until a program to be evaluated ends (step S1714).

In this way, an API tracer that can designate "the surface of the operating system" and "exception module from the surface" can acquire appropriate processing logs of software, and analysis such as identification of bug causes and the like can be attained.

Second Embodiment (Part 3)

In the second embodiment (part 1) and (part 2), the OS module list is automatically acquired based on information provided by the operating system in step S1401 in FIG. 14 and step S1701 in FIG. 17. However, the present invention is not limited to such specific process. "Information provided by the operating system" may be acquired from an interface prepared by the operating system or may be registry information in case of, by way of example only, Windows OS.

Whether the process shown in FIG. 14 or that shown in FIG. 17 is to be executed may be explicitly selected by the user.

Furthermore, in the second embodiment (part 2), exception modules of the operating system are defined in advance. Alternatively, the user may arbitrarily designate such modules in step S1702 in FIG. 17.

Third Embodiment (Part 1)

In the first embodiment, DLL name/interface name/function name/method name, and parameter and return value types corresponding to the function/method are described in the function definition file (see FIG. 10). However, the function definition file in the software evaluation system that implements the log acquisition method according to the present invention is not limited to such specific description contents. In this embodiment, a function definition file description method and a log acquisition method in the function definition file when logs of functions including DEVMODE as those including special structure data are to be acquired.

DEVMODE is a structure of Windows®, which indicates the contents of print setups that can be set on a user interface of a printer driver. The DEVMODE structure includes a part commonly defined by the OS, and a part (extended area) which can be used by a printer vendor for an extended purpose. "Extended area size" is designated at the head of DEVMODE. When the extended area size is designated, processing logs of functions including DEVMODE can be acquired by writing the following contents in the function definition file. That is, when a pointer to the DEVMODE structure is input as a parameter of an API tracer, data contents are read out by the designated size from the last address of a standard area (fixed size) of DEVMODE and are acquired as a log. This embodiment will be described in detail below.

FIG. 18 shows an example of a function definition file of a software evaluation system that implements a log acquisition method according to the third embodiment of the present invention, which is described in prevalently used IDL. This software evaluation system uses a type library file formed by converting this IDL into a token as a function definition file. Note that this embodiment is characterized by providing definition means used to acquire additional binary information, and the function definition file is not limited to IDL. For example, a normal text file may be used, or a markup language such as XML or the like may be used.

FIG. 19 shows a function definition file of the software evaluation system that implements the log acquisition method according to the third embodiment of the present invention, which is described using IDL so as to acquire an instance of pointer data as a processing log by designating additional binary information acquisition with respect to a pointer to a structure.

In definition of a TESTSTRUCT_WITHEXTRA structure, custom(PAT_PARAM_ATTR_ID, "structsizeextra_is( )") is declared with respect to long cExtraBinaryData (1901). Note that PAT_PARAM_ATTR_ID (1900) is an identifier in IDL which is used by this software evaluation system. In this case, "structsizeextra_is( )" is defined, and an argument is defined as TESTSTRUCT_WITHEXTRA* lpParam in a FuncStructsizeextra_is function (1902). When the FuncStructsizeextra_is function is called in practice, binary data as additional information by a size designated by cExtraBinaryData from the head of a memory area where the TESTSTRUCT_WITHEXTRA structure is allocated is saved as a processing log.

Figure 20:
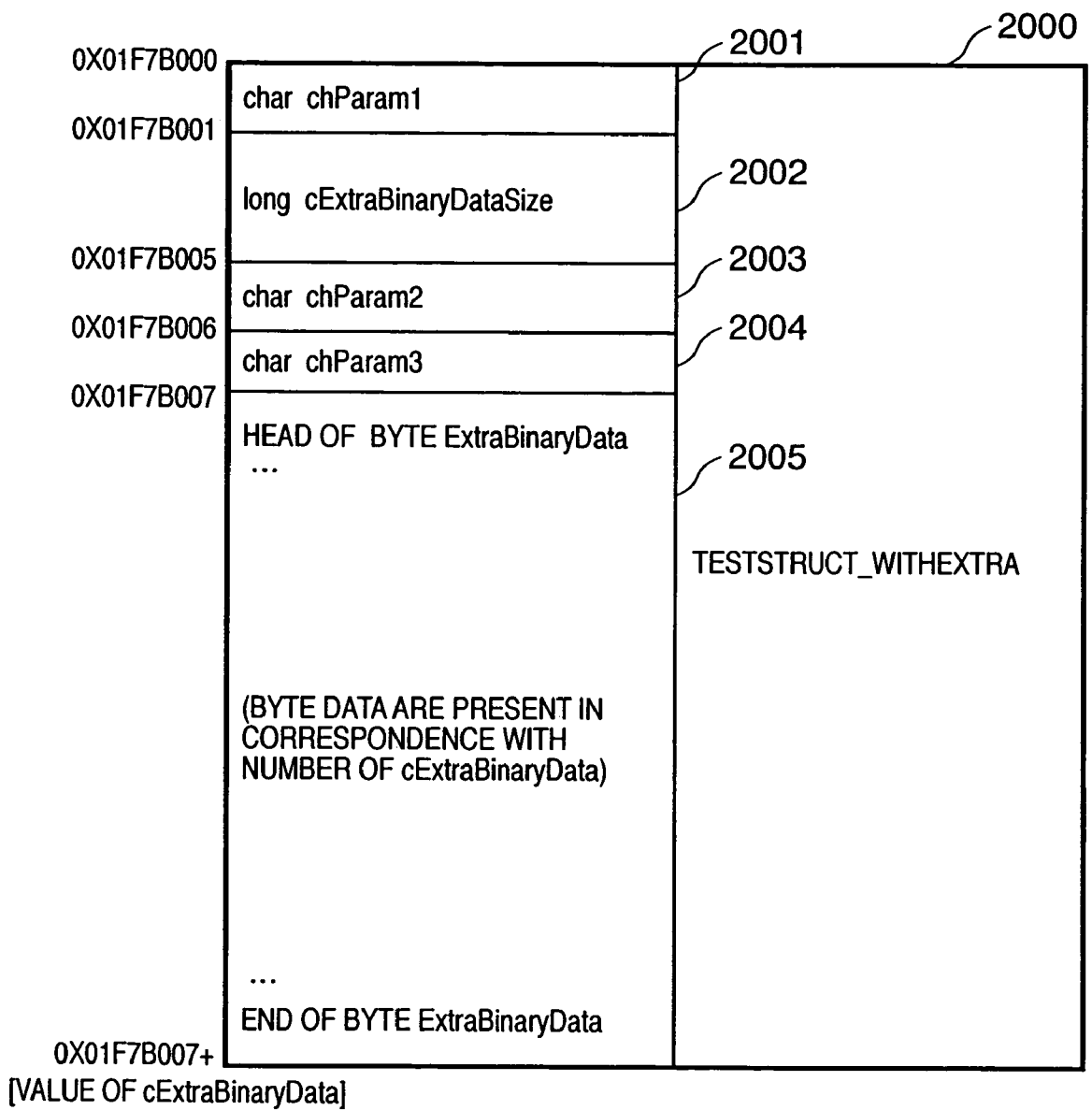
FIG. 20 shows the memory allocation of a structure based on the function definition file shown in FIG. 19.

FIG. 20 shows the memory allocation of the structure based on the function definition file shown in FIG. 19.

In the description of FIG. 20, assume that the start address of a memory where the TESTSTRUCT_WITHEXTRA structure (2000) is allocated is 0x01F7B000. chParam1 (2001) as 1-byte data is allocated at 0x01F7B000, cExtraBinaryDataSize (2002) as 4-byte data is allocated at 0x01F7B001, chParam2 (2003) as 1-byte data is allocated at 0x01F7B005, and chParam3 (2004) as 1-byte data is allocated at 0x01F7B006.

The memory allocation described so far is the same as a normal structure memory allocation, but the TESTSTRUCT_WITHEXTRA structure has additional data ExtraBinaryData (2005) in a memory after chParam3, that is, in an area from 0x01F7B007, and this area size is variable in accordance with cExtraBinaryDataSize. For example, if "8" is stored as the value of cExtraBinaryDataSize, since this means that 8-byte ExtraBinaryData is stored, the memory address of the end of the TESTSTRUCT_WITHEXTRA structure is 0x01F7B00E. For this reason, in order to acquire all data designated by the TESTSTRUCT_WITHEXTRA structure in a log, this ExtraBinaryData must be acquired as binary data in correspondence with the value of cExtraBinaryDataSize. Definition of structsizeextra_is in FIG. 19 is described to meet this requirement.

Figure 21:
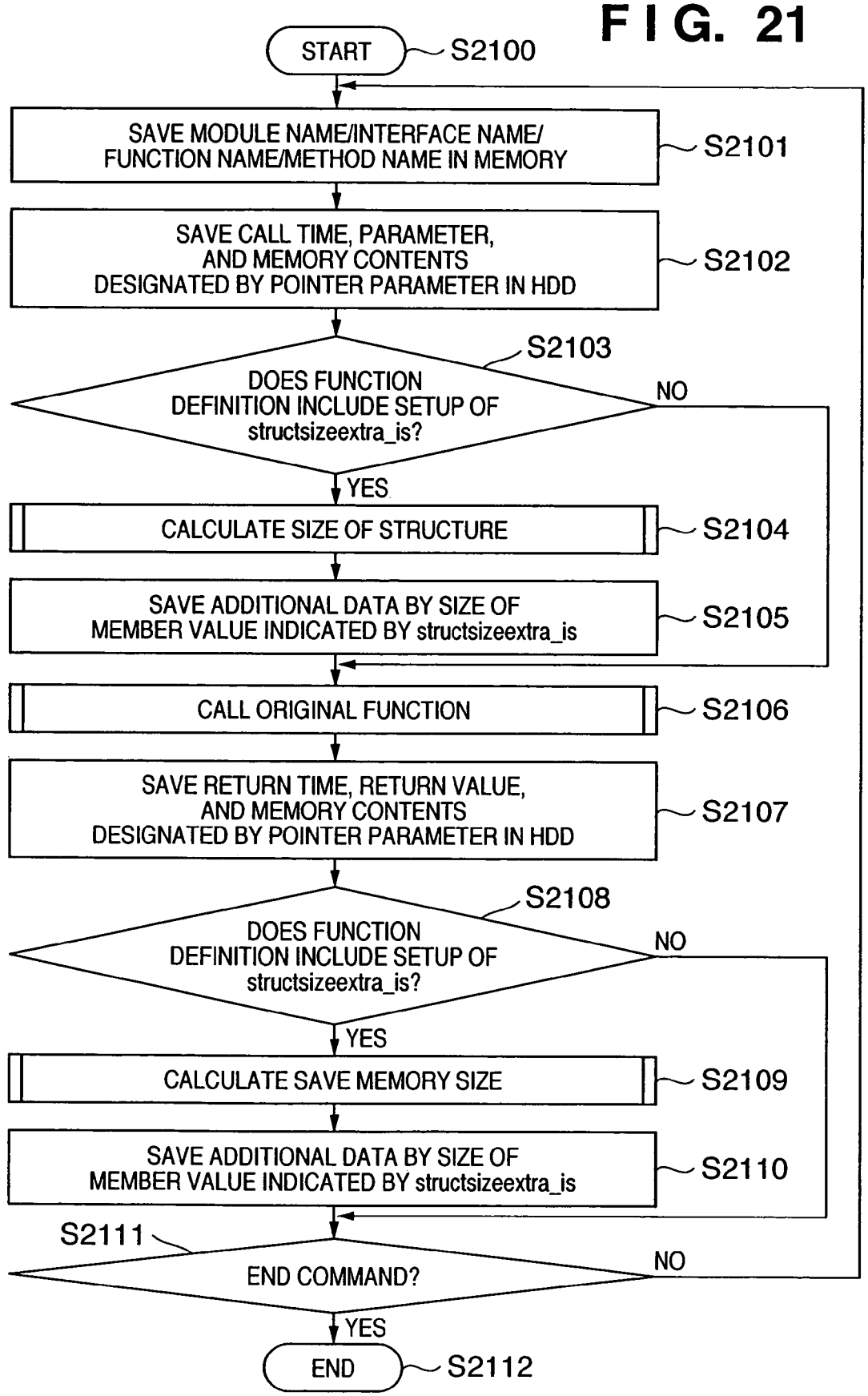
FIG. 21 is a flow chart showing the flow of the process upon acquiring a log when the functions are defined, as shown in FIG. 19.

FIG. 21 is a flow chart showing the flow of a process upon acquiring processing logs by the software evaluation system that implements the log acquisition method according to the third embodiment of the present invention, when the function definition file is described, as shown in FIG. 19.

If the process starts (step S2100), log acquisition starts, and module name/interface name/function name/method name are saved in the HDD (step S2101). Next, the log acquisition code saves the call time, parameter, and memory contents designated by a pointer parameter in the HDD (step S2102). It is then checked if the function definition file includes a setup of structsizeextra_is, that is, the parameter includes a structure including definition of. structsizeextra_is (step S2103). If such definition is found, the size of the structure including that definition is calculated (step S2104).

Subsequently, data for a size designated by the value of a member indicated by structsizeextra_is from a memory area offset by the calculated structure size from the start pointer of the structure is saved in the HDD (step S2105). An original function/method is called (step S2106).

After the control returns from the function/method process, the log acquisition code saves the return time, return value, and memory contents designated by the pointer parameter in the HDD (step S2107). It is then checked if the function definition file includes a setup of structsizeextra_is, that is, the parameter/return value includes a structure including definition of structsizeextra_is (step S2108). If such definition is found, the size of the structure including that definition is calculated (step S2109). Subsequently, data for a size designated by the value of a member indicated by structsizeextra_is from a memory area offset by the calculated structure size from the start pointer of the structure is saved in the HDD (step S2110). This process ends in response to a user's end command (step S2111). If a plurality of members are designated by structsizeextra_is, the processes in steps S2104 and S2105 and steps S2109 and S2110 are repeated for all these designated members.

FIG. 22 shows processing logs acquired based on the function definition file in FIG. 19 by the software evaluation system that implements the log acquisition method according to the third embodiment of the present invention.

Note that processing logs are separately displayed as a text part (2200.) and binary part (2201), and DataID written in text data corresponds to that written in the binary part. For example, in a log of the first call, DataID is 0x0001, which indicates additional binary information written in the binary part, that is, DataID=0x0001. In this case, the first call of FuncStructsizeextraIs acquires additional binary data for 8 bytes; the second call, 40 bytes; the third call, 5 bytes; and fourth call, 7 bytes. When structsizeextra_is is not defined, only chParam1, cExtraBinaryDataSize, chParam2, and chParam3 are acquired. When structsizeextra_is is defined, ExtraBinaryData as additional binary data can be acquired in processing logs for sizes corresponding to respective calls.

In this manner, by providing function definition means for processing log acquisition in correspondence with members of the structure, data which cannot be acquired by normal definition, can be acquired in a processing log.

Third Embodiment (Part 2)

The third embodiment (part 1) has explained the function definition file description method for acquiring data for a predetermined size from the end address of a specific structure as a processing log, and the log acquisition program process in such case. However, the function definition file description method in the software evaluation system that implements the log acquisition method according to the present invention is not limited to such specific method.

FIG. 23 shows a function definition file of the software evaluation system that implements the log acquisition method according to third embodiment of the present invention, which is described using IDL so as to acquire an instance of pointer data as a log by designating a member with respect to a pointer to a structure as an offset.

In definition of TESTSTRUCT_WITHPTRDIFF structure, custom(PAT_PARAM_ATTR_ID, "ptrdiff( )") is declared to LPSTR lpszString and long nNumber (2301, 2302). Note that PAT_PARAM_ATTR_ID (1900) is an identifier in IDL which is used by this software evaluation system. In this case, "ptrdiff( )" is defined, and an argument is defined as TESTSTRUCT_WITHPTRDIFF* in a FuncPtrdiff function (2303). When the FuncPtrdiff function is actually called, LPSTR and long data stored in memory areas which have offsets indicated by numerical values of lpszString and nNumber from the head of the memory area where the TESTSTRUCT_WITHPTRDIFF structure is allocated are saved as a processing log.

Declaration of ptrdiff( ) also serves as the following two condition definitions.

(1) An argument designated by ptrdiff( )is handled not as a specified type but as a numerical value that indicates an offset from the start address of-the structure in practice.

(2) Data with a specified type is held in a memory area designated by that offset.

Figure 24:
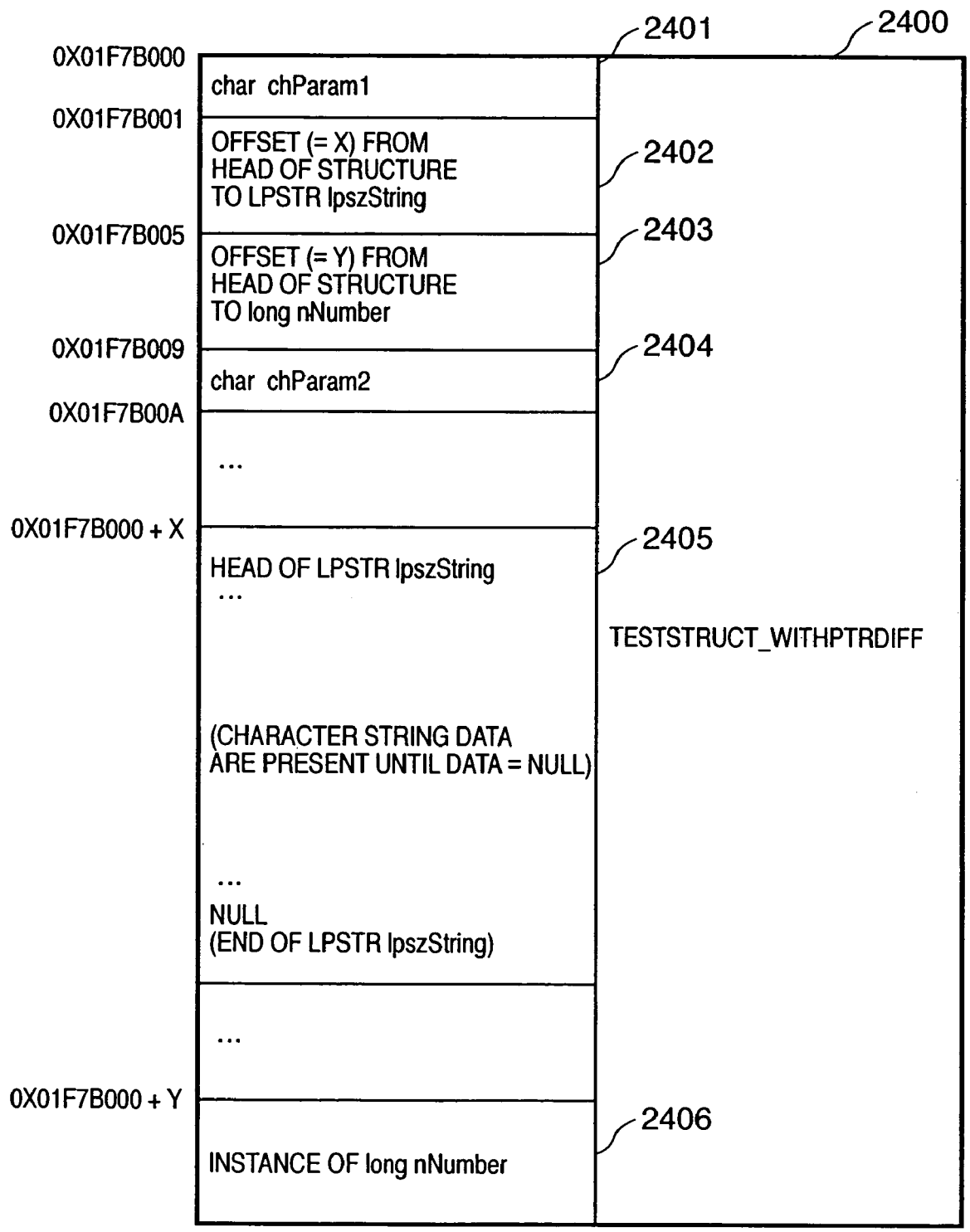
FIG. 24 shows the memory allocation of a structure based on the function definition file shown in FIG. 18.

FIG. 24 shows the memory allocation of the structure based on the function definition file shown in FIG. 18.

In the description of FIG. 24, assume that the start address of a memory where the TESTSTRUCT_WITHPTRDIFF structure (2400) is allocated is 0x01F7B000. chParam1 (2401) as 1-byte data is allocated at 0x01F7B000, an offset (2402) to lpszString as 4-byte data is allocated at 0x01F7B001, an offset (2403) to nNumber as 4-byte data is allocated at 0x01F7B005, and chParam2 (2004) as 1-byte data is allocated at 0x01F7B009. In the TESTSTRUCT_WITHPTRDIFF structure, an instance of lpszString is stored in an area (2405) which is offset from the start address of the structure by a size indicated by the offset (2402), and an instance of nNumber is stored in an area (2406) which is offset from the start address of the structure by a size indicated by the offset (2403). For this eason, in order to acquire all data designated by the TESTSTRUCT_WITHP-TRDIFF structure, instance data of these lpszString and nNumber must be acquired as logs. Definition of ptrdiff in FIG. 23 is described to meet this requirement.

Figure 25:
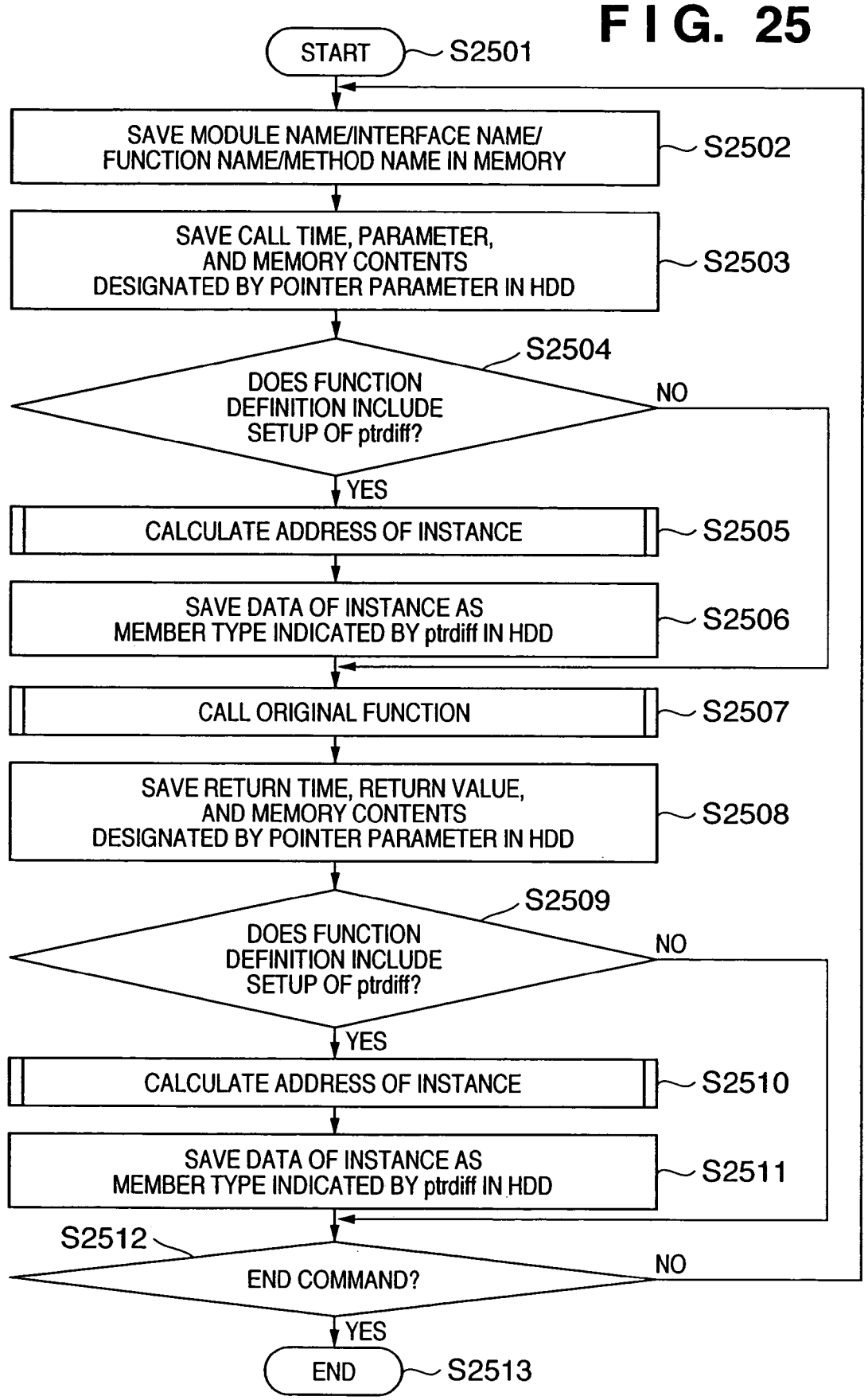
FIG. 25 is a flow chart showing the flow of a process upon acquiring logs, when functions are defined, as shown in FIG. 18.

FIG. 25 is a flow chart showing the flow of a process upon acquiring processing logs by the software evaluation system that implements the log acquisition method according to the third embodiment of the present invention, when the function definition file is described, as shown in FIG. 23.

If the process starts (step S2501), log acquisition starts, and module name/interface name/function name/method name are saved in the HDD (step S2502). Next, the log acquisition code saves the call time, parameter, and memory contents designated by a pointer parameter in the HDD (step S2503). It is then checked if the function definition file includes a setup of ptrdiff, that is, the parameter includes a structure including definition of ptrdiff (step S2504). If such definition is found, the start address of the structure and an offset value of a structure member defined by ptrdiff are added up to calculate the storage address of the structure member defined by ptrdiff (step S2505). Data of the type of the member defined by ptrdiff is saved from a memory area designated by the calculated address in the HDD (step S2506). Next, an original function/method is called (step S2507). After the control returns from the function/method process, the log acquisition code saves the return time, return value, and memory contents designated by the pointer parameter in the HDD (step S2508). It is then checked if the function definition file includes a setup of ptrdiff, that is, the parameter/return value includes a structure including definition of ptrdiff (step S2509). If such definition is found, the start address of the structure and an offset value of a structure member defined by ptrdiff are added up to calculate the storage address of the structure member defined by ptrdiff (step S2510). Data of the type of the member defined by ptrdiff is saved from a memory area designated by the calculated address in the HDD (step S2511). This process ends in response to a user's end command (step S2512). If a plurality of members are designated by ptrdiff, the processes in steps S2505 and S2506 and steps S2510 and S2511 are repeated for all these designated members.

FIG. 26 shows processing logs acquired based on the function definition file in FIG. 23 by the software evaluation system that implements the log acquisition method according to the third embodiment of the present invention. Although respective calls have different offsets, the software evaluation system of this embodiment can adequately acquire instances designated by offsets as processing logs.

In this manner, by providing definition means for processing log acquisition in correspondence with members of the structure, a processing log of a function/method, which includes data that cannot be acquired by normal definition, can be acquired.

Fourth Embodiment (Part 1)

In the first embodiment, DLL name/interface name/function name/method name, and parameter and return value types corresponding to the function/method are described in the function definition file (see FIG. 10). However, the function definition file in the software evaluation system that implements the log acquisition method according to the present invention is not limited to such specific description contents. In this embodiment, a function definition file description method upon acquiring logs of special COM will be explained.

In general, as a printer driver, UNIDRIVER (unidriver), which is embedded in advance in the OS, or a monolithic driver, is used. A printer vendor provides a plug-in module (*.drv) used to receive an output from a monolithic driver or unidriver. In case of a monolithic driver, GDI32.dll uses a general DDI function.

DLLs exchange data using API registered in the registry, but the processing contents to be output from the unidriver to the plug-in module provided by the printer vendor are COM (object-API) which is not registered in the registry. For this reason, the function definition file described in the first embodiment cannot acquire a processing log of special COM. Hence, in this embodiment, an appropriate log can be acquired by describing the function definition file to handle COM, which is output from the unidriver and is not registered in the registry, as normal COM.

FIG. 27 shows an example of a function definition file of a software evaluation system that implements a log acquisition method according to the fourth embodiment of the present invention, which is described in prevalently used IDL. This file describes DLL name/interface name/function name/method name, and parameter/return value types corresponding to the function/method. The software evaluation system according to the fourth embodiment of the present invention uses a type library file formed by converting this IDL into a token as a function definition file. Note that this embodiment is characterized by providing definition means used to acquire more detailed information, and the function definition file is not limited to IDL. For example, a normal text file may be used, or a markup language such as XML or the like may be used.

The software evaluation system according to the fourth embodiment of the present invention determines parameters/return values of respective functions/methods based on the contents instructed by this function definition file, and acquires their contents as logs. Note that this embodiment exemplifies a state wherein a function DllGetClassObject installed in Interface test has the following parameters:

(1) an input parameter "rclsid", which is a parameter indicating "class ID";

(2) an input parameter "riid", which is a parameter indicating "reference interface ID"; and (3) an output parameter "ppv", which is an interface pointer as an instance obtained based on the above two input parameters.

In order to call a method in Interface described in DLL as a code, EXE must generate an instance of Interface on the basis of the class ID and reference interface ID using the DllGetClassObject function and must detect the memory address of that instance in advance.

The best representative of a feature of this embodiment "iid_is" (2703) shown in FIG. 27. That is, by designating riid as the second argument in iid_is, definition "this output parameter is not void* in practice, but is an interface of a type designated by riid" is made. When an API tracer recognizes this definition, details about "a call of a method installed in an interface which is returned as ppv" can be acquired as a processing log.

FIG. 28 shows an example of a function definition file that defines an interface type to be designated in riid. FIG. 28 defines an interface IGetInfo derived from an interface IUnknown. IGetInfo is installed with two methods, which are GetName and FreeNameBuffer.

Figure 29:
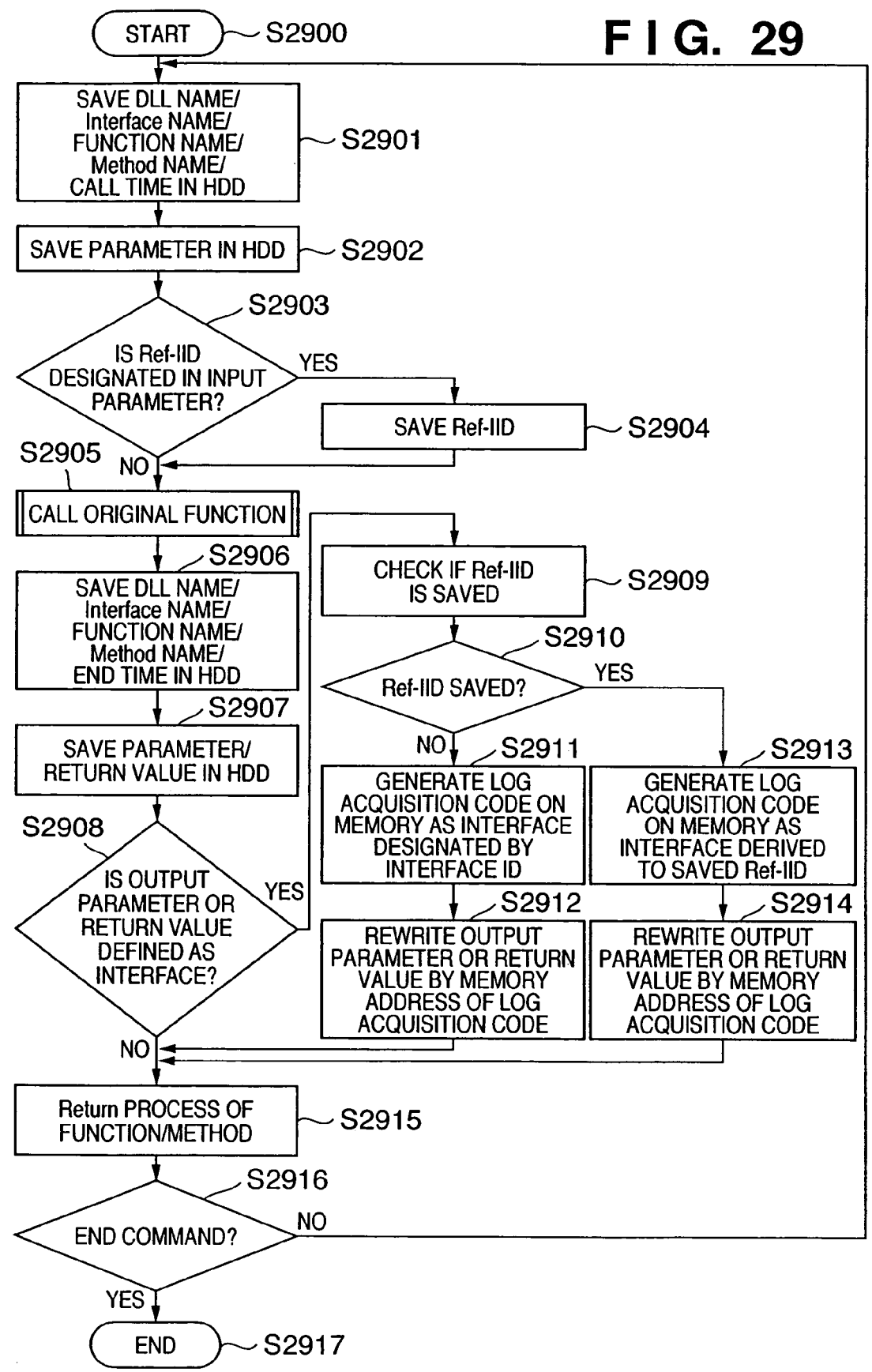
FIG. 29 is a flow chart showing the flow of the process in a software evaluation system that implements a log acquisition method according to the fourth embodiment of the present invention.

FIG. 29 is a flow chart showing the flow of a process in the software evaluation system that implements the log acquisition method according to the fourth embodiment of the present invention.

If the process starts (step S2900), every time a set function/method is called, DLL name/interface name/function name/method name are saved in the HDD (step S2901), and a parameter for that call is saved in the HDD (step S2902). It is checked if the function definition file of an input parameter includes iid_is described using FIG. 27, which is the "definition of the reference interface ID" (step S2903). If such definition is found, that reference interface ID is saved in another area on the memory (step S2904).

A function/method of an instance is called (step S2905). Upon completion of the process in the method, DLL name/interface name/function name/method name/end time are saved in the HDD (step S2906), and a parameter and return value for that call are saved in the HDD (step S2907).

It is checked based on the function definition file shown in FIG. 27 if an output parameter is defined as a pointer to the interface (step S2908). If such definition is found, it is checked if the reference interface ID is saved on the memory (steps S2909 and S2910). If no reference interface ID is saved, that output parameter is recognized as a pointer to the interface itself, a log acquisition code for that pointer is generated on the memory (step S2911), and the corresponding parameter/return value is rewritten by the memory address of the log acquisition code (step S2912). If the reference interface ID is saved, that output parameter is recognized as a pointer of a type derived to the interface indicated by the reference interface ID, for example, IGetInfo shown in FIG. 28, a log acquisition code for that pointer is generated on the memory (step S2913), and the corresponding parameter/return value is rewritten by the memory address of the log acquisition code (step S2914).

If the process in step S2912 or S2914 is complete, or if it is determined in step S2908 that no interface pointer is defined, a return process of the function/method is executed (step S2915).

This process is repeated until a program to be evaluated ends (step S2916).

FIG. 30 shows an example of processing logs acquired by the process shown in FIG. 29. Since output parameter ppv of DllGetClassObject is recognized as an IGetInfo type interface on the basis of definition of iid_is in FIG. 27, not only a log of DllGetClassObject but also a processing log of a call of a method installed in the IGetInfo interface can be acquired. Note that this embodiment is characterized by recognizing the reference interface ID, and the reference interface ID (3001) and IGetInfo are associated with each other in practice on the basis of a known technique. For example, in Windows OS, this information is allocated in the registry, and they can be associated on the basis of registry information. However, other methods may be used to associate them with each other.

As can be seen from the above description, according to this embodiment, by designating "a given input parameter indicates an output parameter type" as a function definition file, more detailed processing logs of software can be acquired, and more detailed analysis such as identification of bug causes and the like can be attained.

Fourth Embodiment (Part 2)

In the fourth embodiment (part 1), an interface as an instance is solved. However, with this technique, "information as a basis of generation of an instance", that is, information based on "class information" in object-oriented programming, cannot be acquired as a processing log. Hence, this embodiment will exemplify a case wherein the class ID is associated with the interface ID so as to acquire class information as additional information in a processing log.

In the function definition file in the software evaluation system that implements the log acquisition method according to this embodiment, the class ID is defined using rclsid of DllGetClassObject in FIG. 27, and function definition "clsid_is" is used for that definition. This "clsid_is" is function definition used to designate "an instance of an interface is generated based on class information which has as the class ID a parameter designated by clsid_is in this DllGetClassObject". By describing the function definition file in this way, the software evaluation system according to this embodiment can acquire more detailed information as a log.

Figure 31:
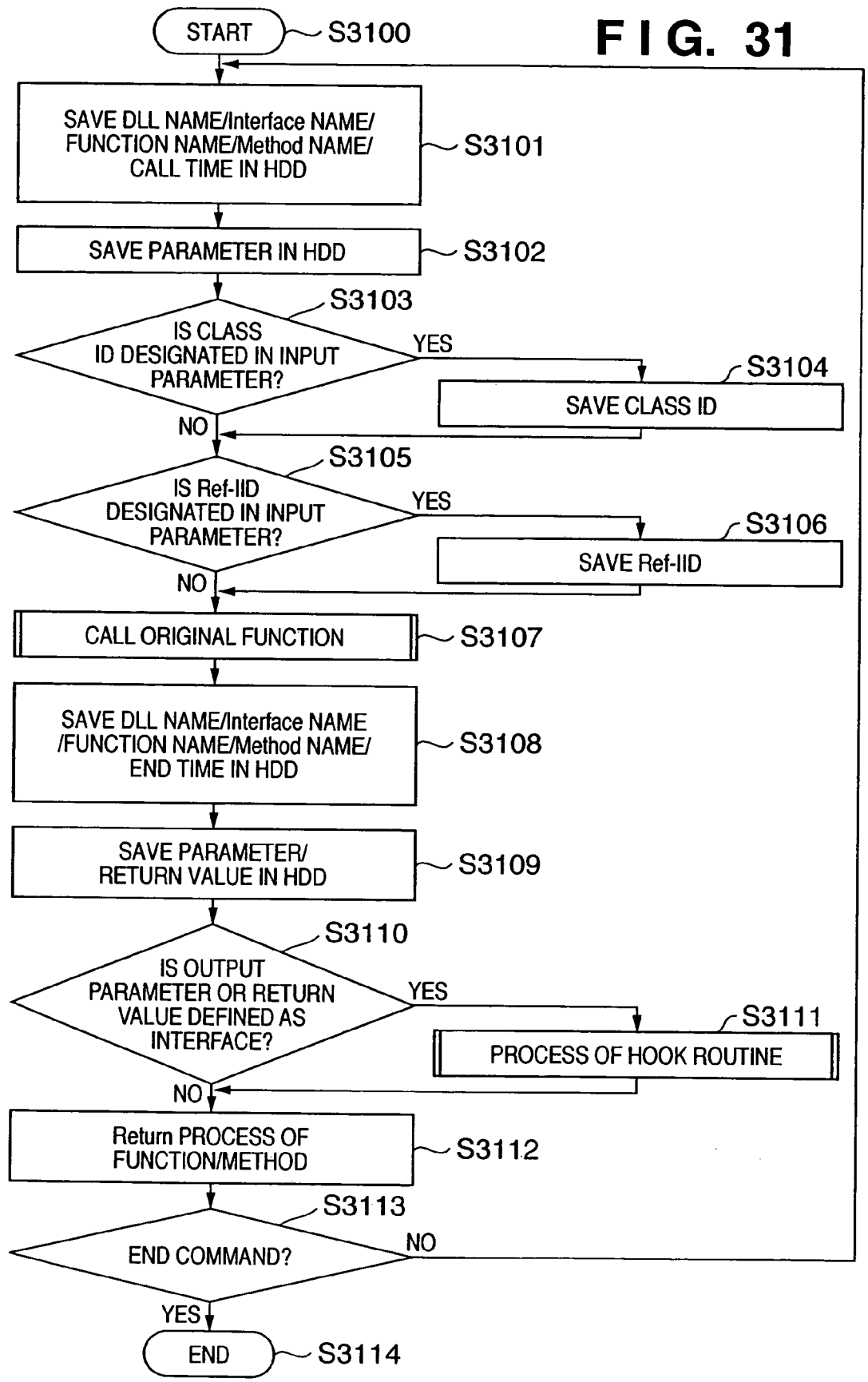
FIG. 31 is a flow chart showing the flow of the process in the software evaluation system that implements the log acquisition method according to the fourth embodiment of the present invention.

FIGS. 31 and 32 are flow charts showing the flow of a process in the software evaluation system that implements the log acquisition method according to the fourth embodiment of the present invention. The process shown in FIGS. 31 and 32 is an example different from FIG. 29.

If the process starts (step S3100), every time a set function/method is called, DLL name/interface name/function name/method name are saved in the HDD (step S3101), and a parameter for that call is saved in the HDD (step S3102). It is checked if the function definition file of an input parameter includes clsid_is described in FIG. 27 and the above description, which is the "definition of the class ID" (step S3103). If such definition is found, that class ID is saved in another area on the memory (step S3104). It is checked if the function definition file of an input parameter includes iid_is described using FIG. 27, which is the "definition of the reference interface ID" (step S3105). If such definition is found, that reference interface ID is saved in another area on the memory (step S3106).

A function/method of an instance is called (step S3107). Upon completion of the process in the method, DLL name/interface name/function name/method name/end time are saved in the HDD (step S3108), and a parameter and return value for that call are saved in the HDD (step S3109). It is checked based on the function definition file shown in FIG. 27 if an output parameter is defined as a pointer to the interface (step S3110). If such definition is found, it is checked if the reference interface ID is saved on the memory (steps S3200 and S3201 in FIG. 32). If no reference interface ID is saved, that output parameter is recognized as a pointer to the interface itself, a log acquisition code for that pointer is generated on the memory (step S3203), and the corresponding parameter/return value is rewritten by the memory address of the log acquisition code (step S3204). If the reference interface ID is saved, that output parameter is recognized as a pointer of a type derived to the interface indicated by the reference interface ID, for example, IGetInfo shown in FIG. 28, a log acquisition code for that pointer is generated on the memory (step S3205), and the corresponding parameter/return value is rewritten by the memory address of the log acquisition code (step S3206).

If the process in step S3204 or S3206 is complete, it is checked if the class ID is saved on the memory (step S3207). If the class ID is saved, the saved class ID is held on the memory in association with a log acquisition code (step S3208). Subsequently, a return process of the function/method is executed (step S3112 in FIG. 31). This process is repeated until a program to be evaluated ends (step S3113).

By holding the class ID in step S3208, more detailed information can be acquired in a log in step S3101 based on that class information upon calling a function in IGetInfo. FIG. 33 shows that module names can be acquired based on the class ID as logs in addition to those in FIG. 30 (3303, 3304, 3305, 3306).

Note that this embodiment is characterized by recognizing the reference interface ID while associating the class ID with an interface parameter, and the class ID (3000) and detailed information such as a module name and the like are associated with each other in practice by a known technique. For example, in Windows OS, this information is allocated in the registry, and they can be associated on the basis of registry information. However, other methods may be used to associate them with each other.

As can be seen from the above description, according to this embodiment, by designating "a given input parameter indicates an output parameter type" as a function definition file, more detailed processing logs of software can be acquired, and more detailed analysis such as identification of bug causes and the like can be attained.

Fifth Embodiment (Part 1)

According to the fourth embodiment, logs of special COM can be acquired. In case of such special COM, since no module name, based on which a processing log is acquired, is registered in the registry, a processing log cannot be acquired based on the module name. Hence, in this embodiment, module names corresponding to individual interface names (processing contents of COM) are prepared as an additional definition file, and a module name is determined and written based on the interface name upon generating a processing log.

FIG. 34 shows an example of a function definition file in a software evaluation system that implements a log acquisition method according to the fifth embodiment of the present invention, which is described in prevalently used IDL. This software evaluation system uses a type library file formed by converting this IDL into a token as a function definition file.

The IDL is used to define an interface, and cannot be used to define a module name as a default. For example, when a plurality of modules provide interfaces using an identical interface definition, and are selectively used as plug-in modules, only a module that selectively calls these plug-in modules can detect to which of plug-in modules each of these interfaces belongs. For example, when the operating system selectively calls driver plug-in modules, if a selection algorithm of the operating system is not open to the public, it is impossible to acquire detailed information associated with that call in a processing log in association with a module name. More specifically, a plug-in module of a universal printer driver included in Microsoft Windows operating system is such case.

However, such plug-in modules are selectively called in association with user's operations in many cases. For example, as for printer drivers, the user selects a printer used to output from a plurality of connected printers, and a plug-in module which has a one-to-one correspondence with that selection operation is called. In this case, if means that can detect that "this module is called in response to the current operation" in addition to the interface definition of the IDL, and instructs that information to the log acquisition program is available, a processing log that includes the module name of the plug-in module can be acquired.

Figure 35:
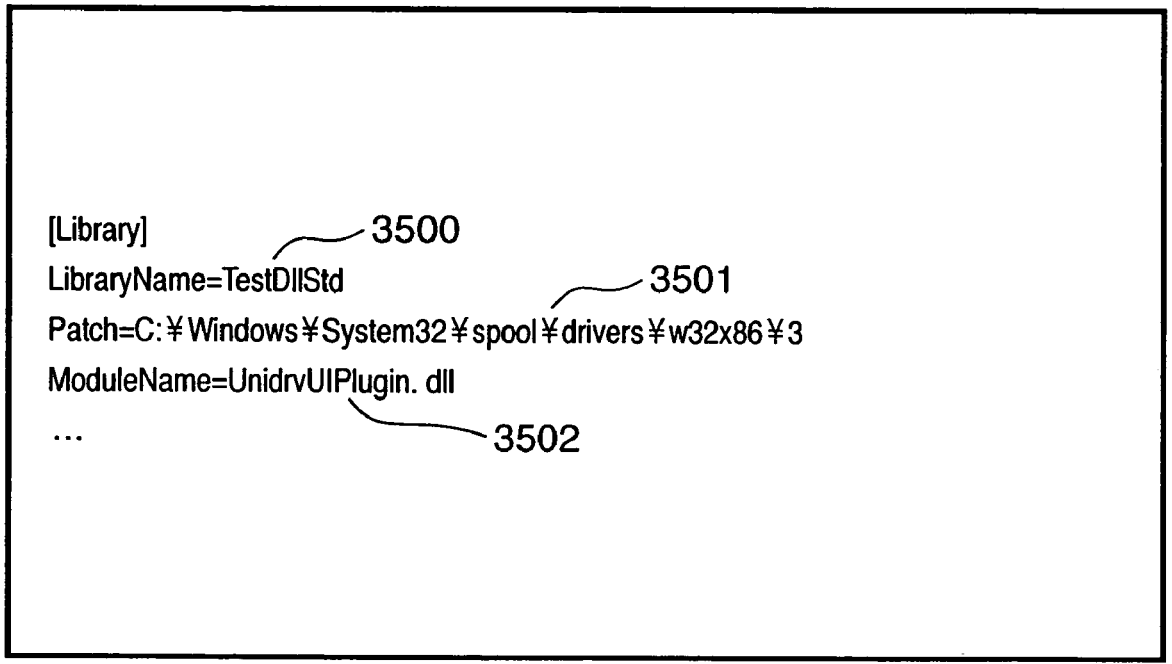
FIG. 35 shows an example wherein a module name is defined in correspondence with a library name.

FIG. 35 shows an example of a function definition file which defines a module name in correspondence with a library name. In FIG. 35, a line 3500 defines a library name, a line 3501 defines the name of a folder where a module is stored, and a line 3502 defines a module name.

FIG. 36 shows an example of a function definition file which defines a module name in correspondence with an interface name. In FIG. 36, a line 3600 defines an interface name, a line 3601 defines the name of a folder where a module is stored, and a line 3602 defines a module name.

In this embodiment, the additional definition of a module name shown in FIGS. 35 and 36 is exemplified as a simple text file. This embodiment is characterized by additionally defining another format with respect to a "standard format used to define DLL/interface/function/method" like the IDL, and acquiring logs of functions/methods based on that additional definition. Hence, the additional definition may be described in a markup language such as HTML, XML, or the like in place of a simple text file.

FIG. 37 is a flow chart showing the flow of a process in the software evaluation system that implements the log acquisition method according to the fifth embodiment of the present invention, and best illustrates a feature of this embodiment.

If the process starts (step S3700), every time a set function/method is called, DLL name/interface name/function name/method name are saved in the HDD (step S3701), and a parameter for that call is saved in the HDD (step S3702). It is checked if the function definition file of an input parameter includes an additional definition of a module name that has been explained using FIGS. 35 and 36 (step S3703). If such additional definition is found, that module name is saved in another area of the memory (step S3704).

A function/method of an instance is called (step S3705). Upon completion of the process in the method, DLL name/interface name/function name/method name/end time are saved in the HDD (step S3706), and a parameter and return value for that call are saved in the HDD (step S3707). Subsequently, a return process of the function/method is executed (step S3708).

This process is repeated until a program to be evaluated ends (step S3709).

In this way, a module name is additionally defined using a format different from the function definition, and a processing log is acquired based on that additional definition. For example, a processing log including a module name of a plug-in module can be acquired when that plug-in module is selectively called in association with a user's operation. An API tracer having this function can acquire processing logs of software, which surely include module names, and more detailed analysis such as identification of bug causes and the like can be attained.

Fifth Embodiment (Part 2)

In the fifth embodiment (part 1), the additional definition of a module name is made using a text file. However, the present invention is not limited to this, and a user interface that allows the user to select a module definition may be prepared. As an implementation method, a user interface that allows the user to select Path and ModuleName setups in FIGS. 35 and 36 may be prepared, or a user interface that allows the user to select one of a plurality of module name additional definition text files may be prepared.

Fifth Embodiment (Part 3)

In the fifth embodiment (part 1) and (part 2), the user designates or selects the additional definition of a module name. However, the present invention is not limited to this, and additional module definitions may be acquired from an interface of the operating system. For example, in NET Framework of Microsoft, respective modules contain XML module definition data, which can be acquired via an interface of the operating system. In this case, a function/method incorporated in a module indicated by the module definition acquired from the operating system is redirected to the log acquisition routine on the basis of header information prepared in that module such as an import function address table, export function address table, and the like, thus acquiring further detailed log information. For example, in Microsoft Windows operating system, this function allows one log data to chronologically describe all pieces of information of calls of export functions incorporated in normal DLLs, calls of methods incorporated in COM interfaces, and calls of methods incorporated in NET assemblies.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

What is claimed is:

1. A log acquisition method for acquiring a log during execution of a program which comprises functions that execute predetermined processes, comprising:
   a step of identifying a designated function of functions in an operating system, which are called upon execution of the program; and
   a step of rewriting addresses of the loaded functions that execute the predetermined processes, and an address of the designated function in the operating system to an address of a function for log acquisition, and the function for log acquisition, comprising:
   a step of calling the functions that execute the predetermined processes and the designated function in the operating system, making the functions execute the predetermined processes, and passing a received execution result to the program;
   a step of recording predetermined information upon calling the functions that execute the predetermined processes and the designated function in the operating system;
   a step of recording predetermined information upon receiving the execution result;
   a step of defining one or a plurality of predetermined modules; and
   a step of determining whether or not a given function is called via the defined module, and in that when the function is called via the defined module, the predetermined information upon calling that function is excluded from a recording target.

2. The method according to claim 1, wherein the predetermined information upon calling the functions that execute the predetermined processes and the designated function in the operating system comprises at least one of function names of the called functions, a time upon calling, a parameter upon calling, and memory contents designated by a pointer parameter upon calling.

3. The method according to claim 1, wherein the predetermined information upon receiving the execution result comprises at least one of a time upon reception, a parameter upon reception, a return value upon reception, and memory contents designated by a pointer parameter upon reception.

4. The method according to claim 1, wherein the addresses of the functions that execute the predetermined processes are described in an import function address table for respective dynamic link libraries that provide the functions.

5. The method according to claim 1, further comprising, a step of selecting an address to be rewritten to the address of the function for log acquisition from the addresses of the functions that execute the predetermined processes, and in that the rewriting step includes a step of rewriting the address of the function selected in the selection step.

6. The method according to claim 1, further comprising:
   a step of defining one or a plurality of predetermined modules included in the operating system; and
   a step of determining whether or not a given function is called via the defined module, and in that when the function is called via a module included in the operating system other than the defined modules, the predetermined information upon calling that function is excluded from a recording target.

7. The method according to claim 1, wherein when the predetermined information is a structure, information allocated at a position skipped by a size of the structure from a head of a memory area where the structure is stored, is recorded in correspondence with a size designated in the structure.

8. The method according to claim 1, wherein when the predetermined information is a structure, information allocated at a position skipped by an offset designated in the structure from a head of a memory area where the structure is stored, is recorded as data of a defined data type.

9. The method according to claim 1, wherein which of a plurality of pieces of predetermined information of functions of modules represents information of an object and which of them represents a class ID of the object are defined, and information of the object contained in the predetermined information of a function is recorded on the basis of the class ID of the object upon calling that function.

10. The method according to claim 1, wherein which of a plurality of pieces of predetermined information of functions of modules represents information of an object and which of them represents an interface ID of the object are defined, and information of the object stored in the predetermined information of a function is recorded on the basis of the interface ID of the object upon calling that function.

11. The method according to claim 1, wherein an additional definition of a module name corresponding to a library or each interface is prepared, and the module name is recorded with reference to the additional definition upon calling a function.

* * * * *